(12) United States Patent
Lin et al.

(10) Patent No.: US 11,928,295 B2
(45) Date of Patent: Mar. 12, 2024

(54) DATA TRANSMISSION METHOD, DATA TRANSMISSION SYSTEM, AND PROCESSOR

(71) Applicant: NOVATEK Microelectronics Corp., Hsinchu (TW)

(72) Inventors: Chung-Cher Lin, Hsinchu County (TW); Yun-Hsiang Yeh, Hsinchu County (TW); Ta-Keng Weng, Taichung (TW)

(73) Assignee: NOVATEK Microelectronics Corp., Hsinchu (TW)

( * ) Notice: Subject to any disclaimer, the term of this patent is extended or adjusted under 35 U.S.C. 154(b) by 0 days.

(21) Appl. No.: 17/805,466

(22) Filed: Jun. 5, 2022

(65) Prior Publication Data

US 2023/0020075 A1 Jan. 19, 2023

Related U.S. Application Data

(60) Provisional application No. 63/221,011, filed on Jul. 13, 2021.

(30) Foreign Application Priority Data

Apr. 7, 2022 (TW) .................................. 111113248

(51) Int. Cl.
*G06F 3/044* (2006.01)
*G06F 3/01* (2006.01)
*G06F 3/041* (2006.01)

(52) U.S. Cl.
CPC ............ *G06F 3/0442* (2019.05); *G06F 3/016* (2013.01); *G06F 3/0416* (2013.01); *G06F 3/0441* (2019.05); *G06F 2203/04112* (2013.01)

(58) Field of Classification Search
CPC ...... G06F 3/016; G06F 3/0441; G06F 3/0442; G06F 3/0416; G06F 2203/04112; G06F 3/044
See application file for complete search history.

(56) References Cited

U.S. PATENT DOCUMENTS 8,228,303 B2 * 7/2012 Naruse ................ G06F 3/03547
345/173
8,643,625 B2 * 2/2014 Kruglick ................ G06F 21/35
345/1.3

(Continued)

FOREIGN PATENT DOCUMENTS

CN 101552806 A 10/2009
CN 103631466 A 3/2014

(Continued)

*Primary Examiner* — Olga V Merkoulova
(74) *Attorney, Agent, or Firm* — CKC & Partners Co., LLC

(57) ABSTRACT

A data transmission method includes: transmitting a plurality of first transmitting signals from a plurality of transmitting areas of the first touch device; determining, by the second touch device, whether a first sensing signal corresponding to the plurality of first transmitting signals is received; if yes selecting, by the second touch device, a receiving area in a first overlap range according to signal intensity of the first sensing signal; transmitting a second transmitting signal from the receiving area; determining, by the first touch device, whether a second sensing signal corresponding to the second transmitting signal is received; if yes, selecting, by the first touch device, a first transmitting area in a second overlap range from the plurality of transmitting areas according to signal intensity of the second sensing signal; determining a final transmitting area and a final receiving area; and performing a data transmission process.

20 Claims, 23 Drawing Sheets

(56) References Cited

U.S. PATENT DOCUMENTS

| | | | |
|---|---|---|---|
| 9,041,687 B2* | 5/2015 | Lai | G06F 3/0446 |
| | | | 345/174 |
| 9,274,689 B2* | 3/2016 | Shigeta | G06F 3/0484 |
| 9,582,186 B2 | 2/2017 | Kuo et al. | |
| 9,585,182 B2* | 2/2017 | Pi | A43B 3/34 |
| 9,727,184 B2* | 8/2017 | Cho | G06F 3/04166 |
| 9,978,340 B2* | 5/2018 | Ting | G06F 3/147 |
| 10,754,479 B2 | 8/2020 | Chen et al. | |
| 2007/0287386 A1* | 12/2007 | Agrawal | A61B 5/332 |
| | | | 455/67.11 |
| 2008/0122792 A1* | 5/2008 | Izadi | G06F 3/04883 |
| | | | 345/173 |
| 2009/0251339 A1* | 10/2009 | Naruse | H04M 1/72412 |
| | | | 341/33 |
| 2011/0304583 A1* | 12/2011 | Kruglick | G06F 21/83 |
| | | | 345/174 |
| 2013/0147760 A1* | 6/2013 | Lai | G06F 3/04162 |
| | | | 345/174 |
| 2013/0278540 A1 | 10/2013 | Yilmaz | |
| 2015/0071648 A1* | 3/2015 | Hong | G06F 21/32 |
| | | | 715/740 |
| 2015/0145792 A1 | 5/2015 | Chiang et al. | |
| 2015/0178729 A1 | 6/2015 | Kuo | |
| 2016/0099750 A1 | 4/2016 | Yogurtcu et al. | |
| 2018/0188853 A1* | 7/2018 | Chen | G06F 3/0442 |

FOREIGN PATENT DOCUMENTS

| | | |
|---|---|---|
| TW | I522896 B | 2/2016 |
| TW | 201826099 A | 7/2018 |

* cited by examiner

DATA TRANSMISSION METHOD, DATA TRANSMISSION SYSTEM, AND PROCESSOR

RELATED APPLICATIONS

This application claims priority to U.S. Provisional Application Ser. No. 63/221,011, filed Jul. 13, 2021 and Taiwanese Application Serial Number 111113248, filed Apr. 7, 2022, which are herein incorporated by reference.

BACKGROUND

Technical Field

The present disclosure relates to touch technology. More particularly, the present disclosure relates to a data transmission method, a data transmission system, and a processor.

Description of Related Art

With developments of technology, more and more electronic apparatuses are designed with touch devices. In general, a touch device can detect a touch event and a touch position on the touch device, and perform related operation according to the touch position.

SUMMARY

Some aspects of the present disclosure are to provide a data transmission method for a first touch device and a second touch device. The data transmission method includes following operations: transmitting a plurality of first transmitting signals from a plurality of transmitting areas of the first touch device; determining, by the second touch device, whether a first sensing signal corresponding to the plurality of first transmitting signals is received; selecting, by the second touch device, a receiving area in a first overlap range according to signal intensity of the first sensing signal when the first sensing signal corresponding to the plurality of first transmitting signals is received; transmitting a second transmitting signal from the receiving area; determining, by the first touch device, whether a second sensing signal corresponding to the second transmitting signal is received; selecting, by the first touch device, a first transmitting area in a second overlap range from the plurality of transmitting areas according to signal intensity of the second sensing signal when the second sensing signal corresponding to the second transmitting signal is received; determining, by the first touch device, the first transmitting area to be a final transmitting area and determining, by the second touch device, the receiving area to be a final receiving area; and performing, by the final transmitting area and the final receiving area, a data transmission process between the first touch device and the second touch device.

Some aspects of the present disclosure are to provide a data transmission system. The data transmission system includes a first touch device and a second touch device. The first touch device includes a plurality of transmitting areas to transmit a plurality of first transmitting signals. The second touch device is to determine whether a first sensing signal corresponding to the plurality of first transmitting signals is received and to select a receiving area in a first overlap range according to signal intensity of the first sensing signal to transmit a second transmitting signal. The first touch device determines whether a second sensing signal corresponding to the second transmitting signal is received and selects a first transmitting area in a second overlap range from the plurality of transmitting areas according to signal intensity of the second sensing signal. The first touch device determines the first transmitting area to be a final transmitting area and the second touch device determines the receiving area to be a final receiving area. The final transmitting area and the final receiving area perform a data transmission process between the first touch device and the second touch device.

Some aspects of the present disclosure are to provide a processor. When a plurality of transmitting areas of a first touch device transmit a plurality of first transmitting signals, the processor in a second touch device determines whether a first sensing signal corresponding to the plurality of first transmitting signals is received. When the first sensing signal corresponding to the plurality of first transmitting signals is received, the processor selects a receiving area in a first overlap range to be a final receiving area according to signal intensity of the first sensing signal and controls the receiving area to transmit a second transmitting signal for the first touch device to receive. The final receiving area and a final transmitting area in a second overlap range of the first touch device perform a data transmission process between the first touch device and the second touch device.

BRIEF DESCRIPTION OF THE DRAWINGS

The disclosure can be more fully understood by reading the following detailed description of the embodiment, with reference made to the accompanying drawings as follows.

DETAILED DESCRIPTION

In the present disclosure, "connected" or "coupled" may refer to "electrically connected" or "electrically coupled." "Connected" or "coupled" may also refer to operations or actions between two or more elements.

Figure 1:
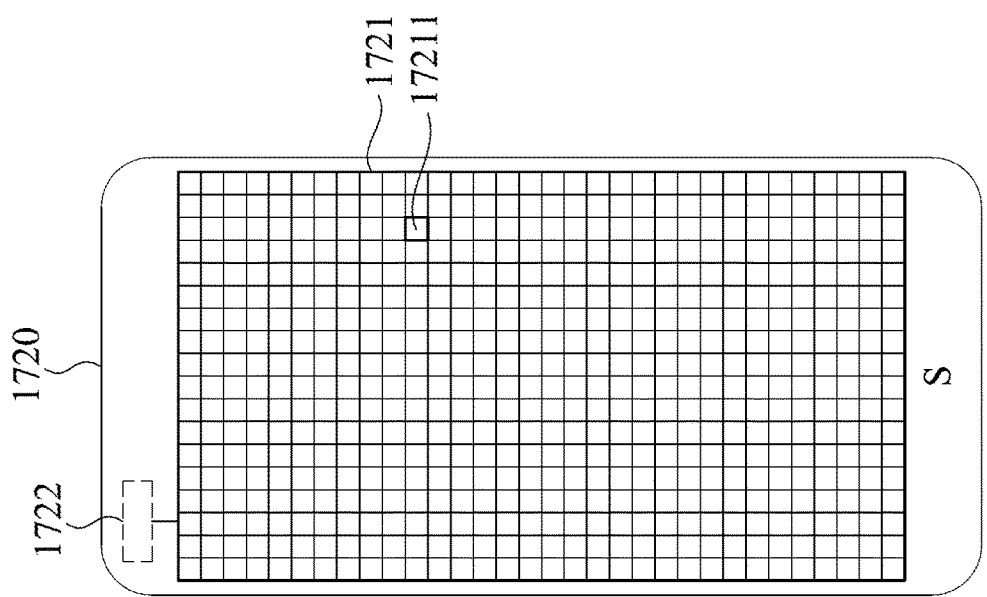
FIG. 1 is a schematic diagram illustrating a data transmission system according to some embodiments of the present disclosure.
Figure 1:
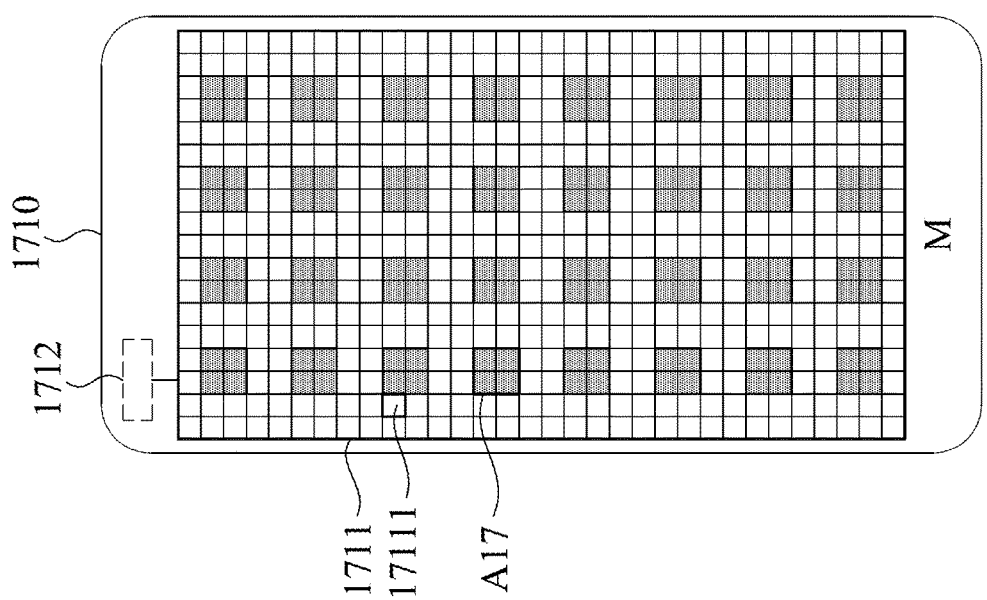

Reference is made to FIG. 1. FIG. 1 is a schematic diagram illustrating a data transmission system 1700 according to some embodiments of the present disclosure.

As illustrated in FIG. 1, the data transmission system 1700 includes a touch device 1710 and a touch device 1720. In this example, the touch device 1710 and the touch device 1720 are cell phones, but the present disclosure is not limited thereto. In some embodiments, the touch device 1710 or the touch device 1720 can be a tablet, a notebook, a car display device, or other electronic devices with the touch function. The touch device 1710 has a touch panel 1711 and a processor 1712, and the processor 1712 is coupled to the touch panel 1711. The touch device 1720 has a touch panel 1721 and a processor 1722, and the processor 1722 is coupled to the touch panel 1721.

In some embodiments, the touch panel 1711 and the touch panel 1721 have in-cell structures and self-capacitance type structures. In some other embodiments, the touch panel 1711 and the touch panel 1721 have mutual-capacitance type structures.

It can be determined first that the touch device 1710 and the touch device 1720 operate individually to perform a touch sensing process or a fingerprint recognition process (normal touch mode) or that the touch device 170 and the touch device 1720 work together to perform a data transmission process (data transmission mode). When the touch device 1710 and the touch device 1720 work together to perform a data transmission process (data transmission mode), the touch device 170 and the touch device 1720 can perform a handshake process in advance to determine which device operates as a master device, which device operates as a slave device, the frequency of transmitting signals described below, or other parameters.

For example, it is determined that the touch device 1710 operates as a master device M and the touch device 1720 operates as a slave device S. Electrodes 17111 on the touch panel 1711 correspond to a specific pattern. As illustrated in FIG. 1, the specific pattern corresponds to multiple original transmitting areas A17, each of the original transmitting areas A17 is in a square-shape and includes multiple electrodes 17111 (e.g., four electrodes 17111), and the electrodes 17111 in the original transmitting areas A17 can transmit a plurality of transmitting signals with a first frequency. In some embodiments, each of the transmitting areas A17 is in a rectangle shape.

Each of FIG. 2A, FIG. 2C, FIG. 2E, FIG. 2G, FIG. 2I, and FIG. 2K is an operation of a data transmission system 1800 according to some embodiments of the present disclosure. For purpose of clarity, FIG. 2B, FIG. 2D, FIG. 2F, FIG. 2H, FIG. 2J, and FIG. 2L are exploded diagrams of FIG. 2A, FIG. 2C, FIG. 2E, FIG. 2G, FIG. 2I, and FIG. 2K respectively.

The data transmission system 1800 in FIG. 2A to FIG. 2L can be implemented by the data transmission system 1700 in FIG. 1. In other words, the data transmission system 1800 includes a touch device 1810 and a touch device 1820. A touch panel 1811 of the touch device 1810 includes electrodes 18111, and a touch panel 1821 of the touch device 1820 includes electrodes 18211.

As described above, it can be determined first that the touch device 1810 and the touch device 1820 operate individually to perform a touch sensing process or a fingerprint recognition process (normal touch mode) or that the touch device 18100 and the touch device 1820 work together to perform a data transmission process (data transmission mode).

For example, the touch device 1820 can receive a specific signal from the touch device 1810 and send back a confirmation signal to the touch device 1810 according to the specific signal to confirm that the current operation is the data transmission process. When the touch device 1810 and the touch device 1820 work together to perform the data transmission process, the touch device 1810 and the touch device 1820 cannot perform the touch sensing process or the fingerprint recognition process.

In addition, when the touch device 1810 and the touch device 1820 work together to perform the data transmission process, the touch device 1810 and the touch device 1820 can perform the handshake process in advance to determine that the touch device 1810 operates as the master device M and the touch device 1820 operates as the slave device S. In this situation, the touch device 1810 operates in a transmitting state, and the electrodes 18111 in the original transmitting areas A18 on the touch panel 1811 can transmit a plurality of transmitting signals with a first frequency. The touch device 1820 operates in a receiving state and all of the electrodes 18211 are enabled to receive signals. At this time, the touch device 1820 cannot transmit signals.

Figure 2A:
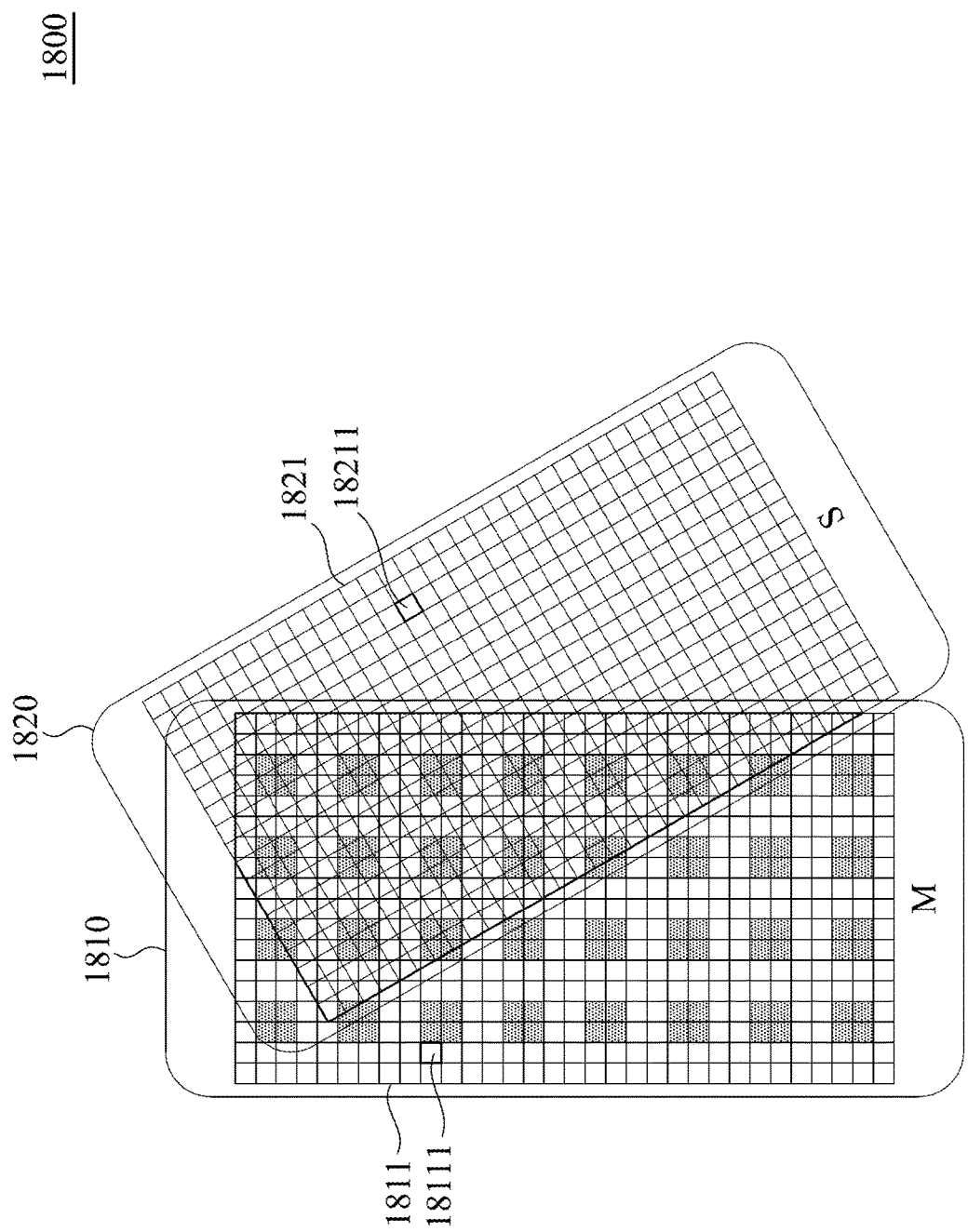
FIGS. 2A-2B are schematic diagrams illustrating an operation of the data transmission system according to some embodiments of the present disclosure.
Figure 2B:
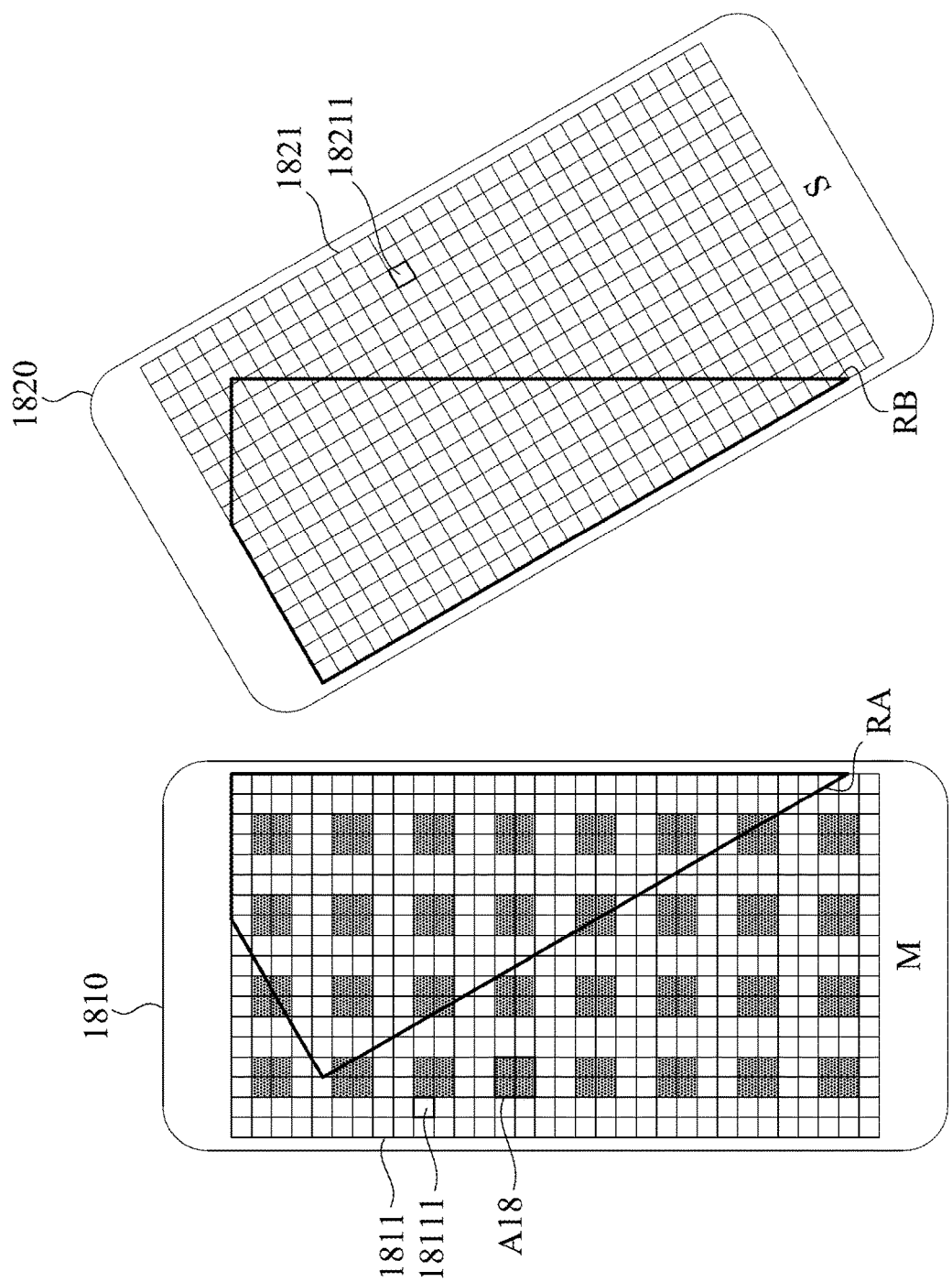

As illustrated in FIG. 2A and FIG. 2B, when the touch panel 1821 contacts or is significantly close to the touch panel 1821 by face-to-face (e.g., panel-to-panel), a range RA (hereafter an overlap range RA) on the touch panel 1811 and a range RB (hereafter an overlap range RB) on the touch panel 1821 are overlapped. In this situation, some electrodes 18211 in the overlap range RB can receive sensing signals.

Figure 2C:
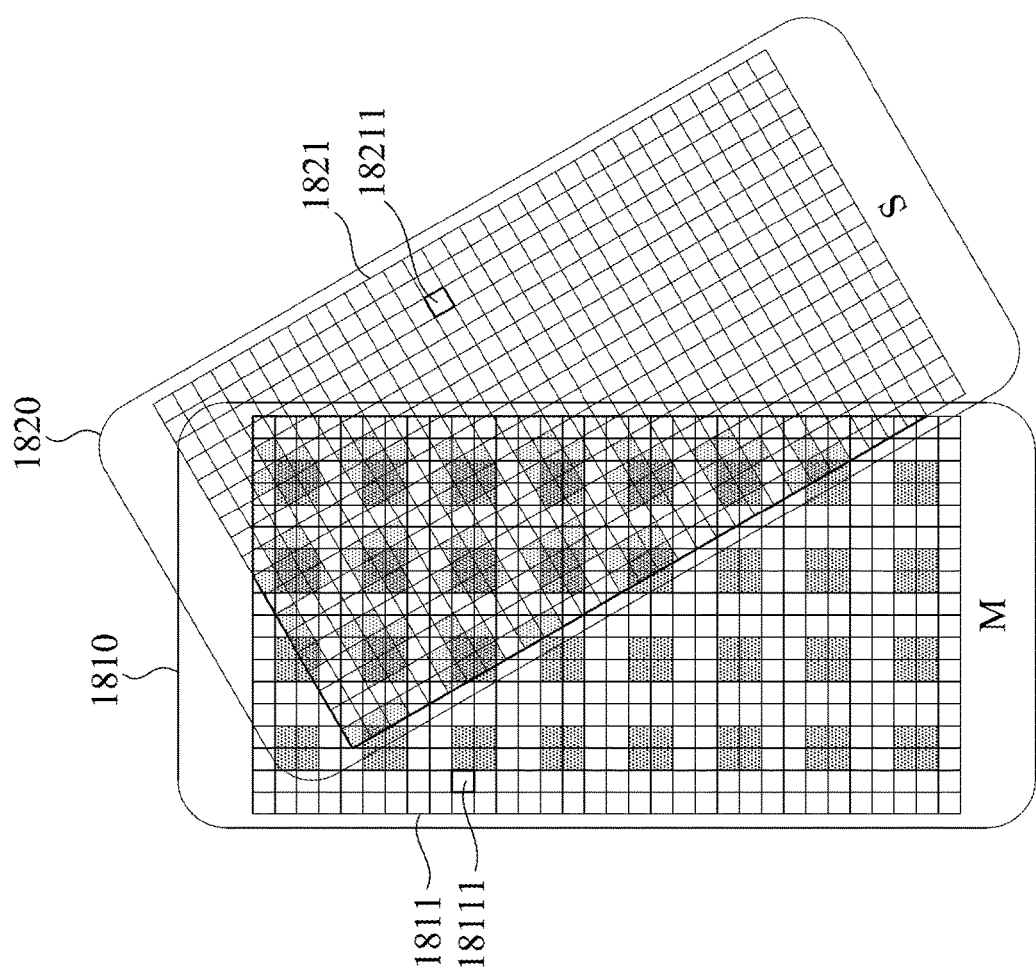
FIGS. 2C-2D are schematic diagrams illustrating an operation of the data transmission system according to some embodiments of the present disclosure.
Figure 2D:
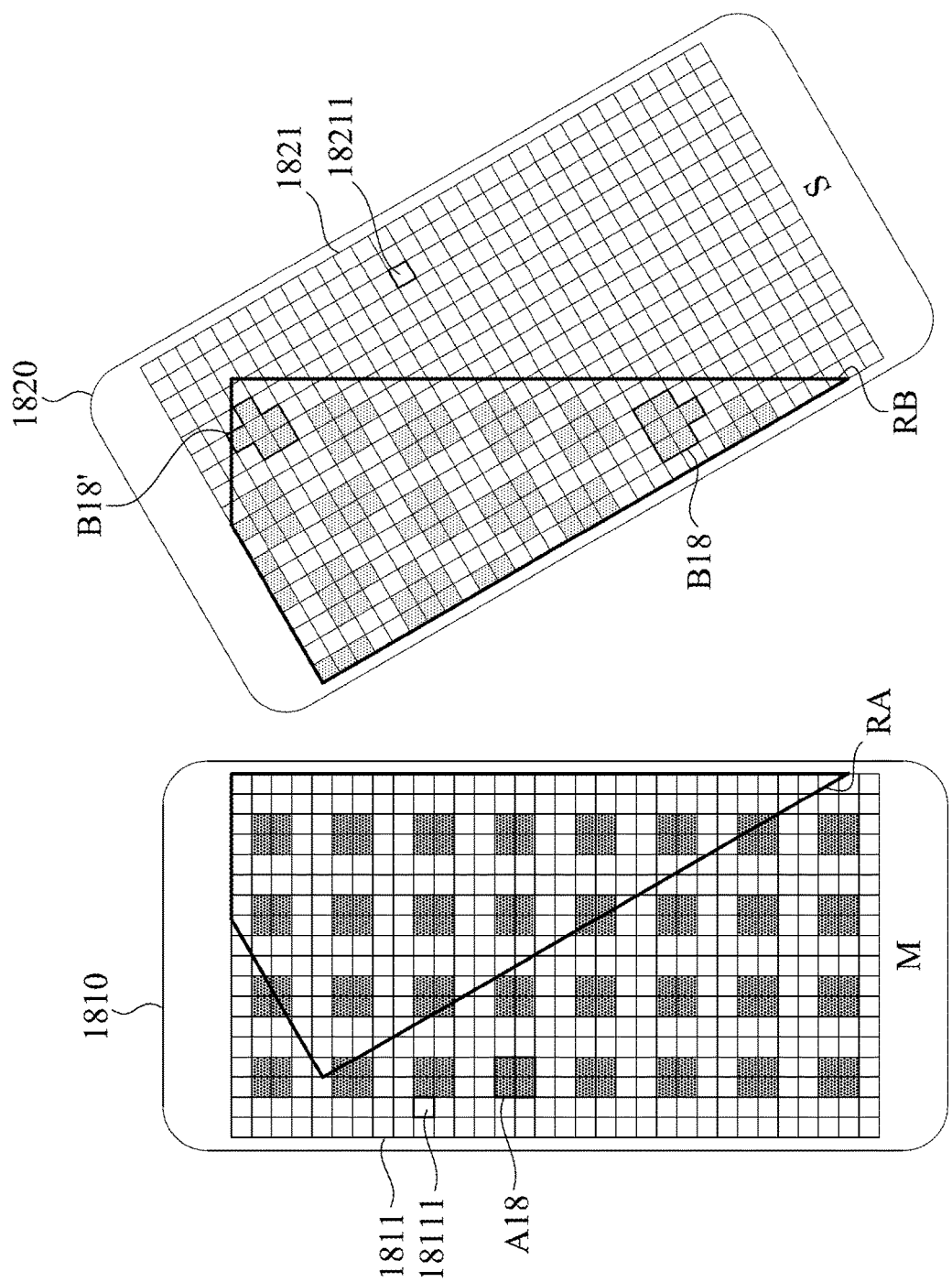

As illustrated in FIG. 2C and FIG. 2D, the electrodes 18211 in one or multiple receiving areas B18 in the overlap range RB (there are multiple receiving areas B18 in the overlap range RB in FIG. 2C and FIG. 2D) can receive sensing signals corresponding to the transmitting signals from the original transmitting areas A18. In general, the electrodes 18211 outside the overlap range RB may receive weak signals, but signal intensity of the sensing signals received by the one or the multiple receiving areas B18 in the overlap range RB is larger than a signal intensity threshold value. Accordingly, the processor in the touch device 1820 can set the signal intensity threshold value, and select the one or the multiple receiving areas B18 in the overlap range RB according to the signal intensity threshold value and the signal intensity of the received sensing signals. In some embodiments, there is at least one receiving areas B18' in the receiving areas B18, and not all part of the receiving areas B18' is in the overlap range RB (e.g., most part of the receiving area B18' is in the overlap range RB, but not all part of the receiving area B18' in the overlap range RB).

Then, operations of the touch device 1810 and the touch device 1820 are exchanged.

Figure 2E:
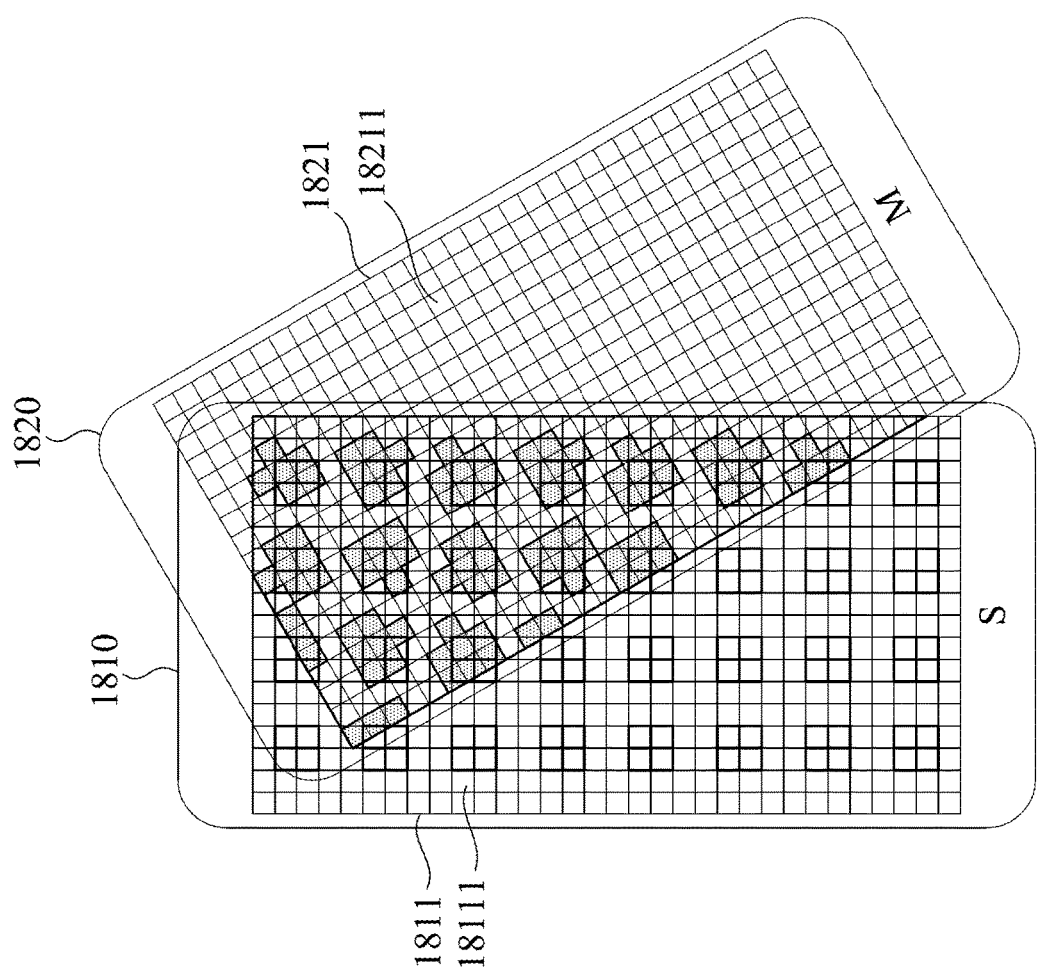
FIGS. 2E-2F are schematic diagrams illustrating an operation of the data transmission system according to some embodiments of the present disclosure.
Figure 2F:
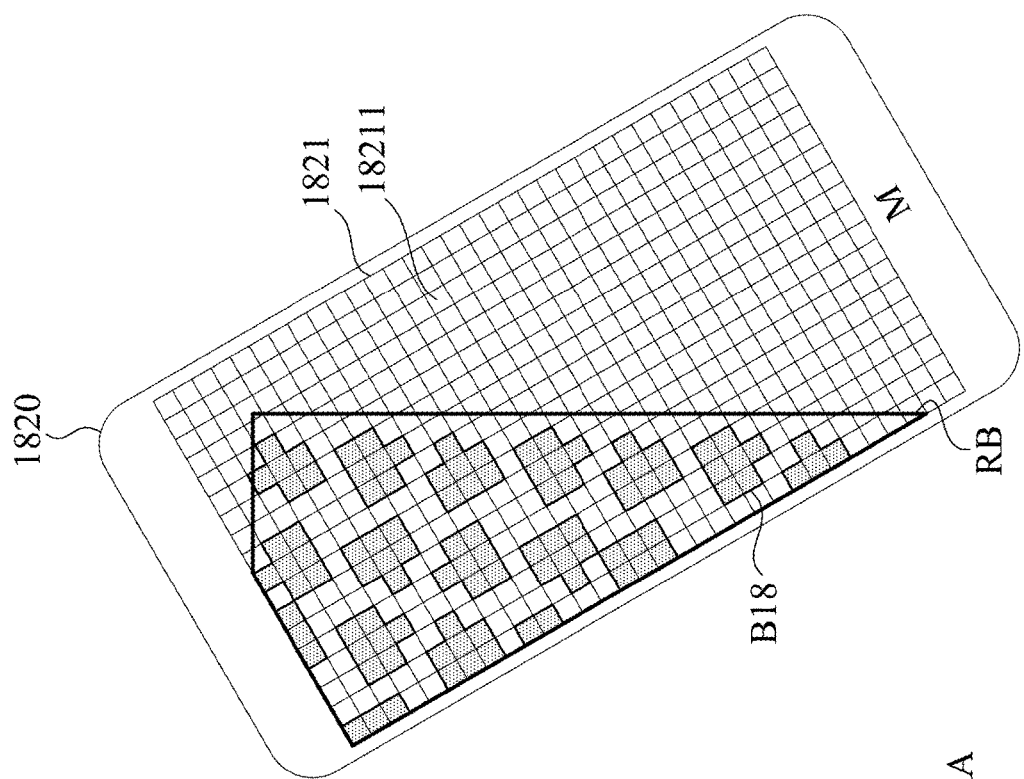
Figure 2F:
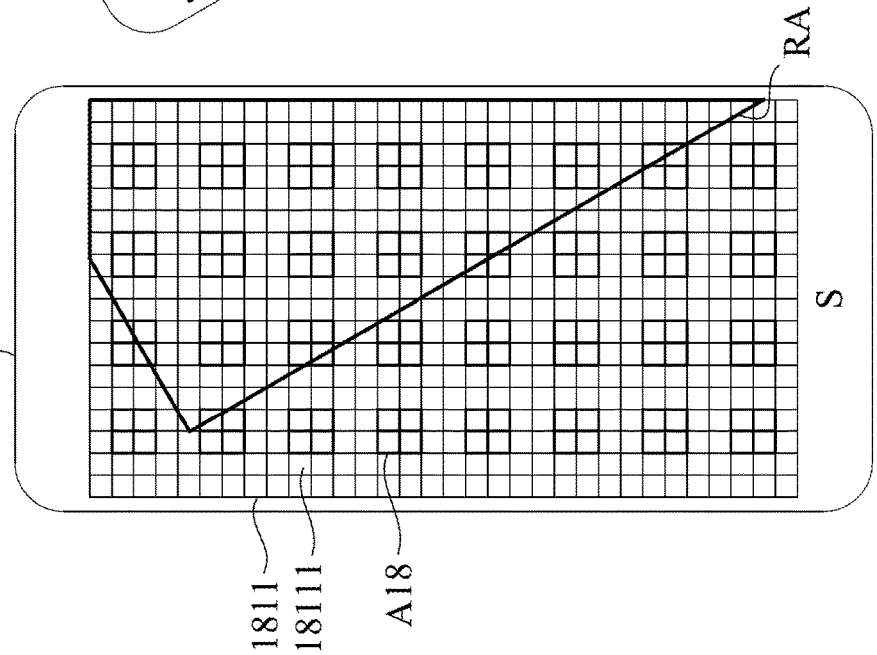

As illustrated in FIG. 2E and FIG. 2F, the touch device 1810 operates as the slave device S and the touch device 1820 operates as the master device M. In other words, the touch device 1810 operates in a receiving state, and the touch device 1820 operates in a transmitting state. In this situation, the electrodes 18211 in the one or the multiple receiving areas B18 in the overlap range RB can transmit a plurality of transmitting signals, and some electrodes 18111 in the touch device 1810 can receive corresponding sensing signals.

Figure 2G:
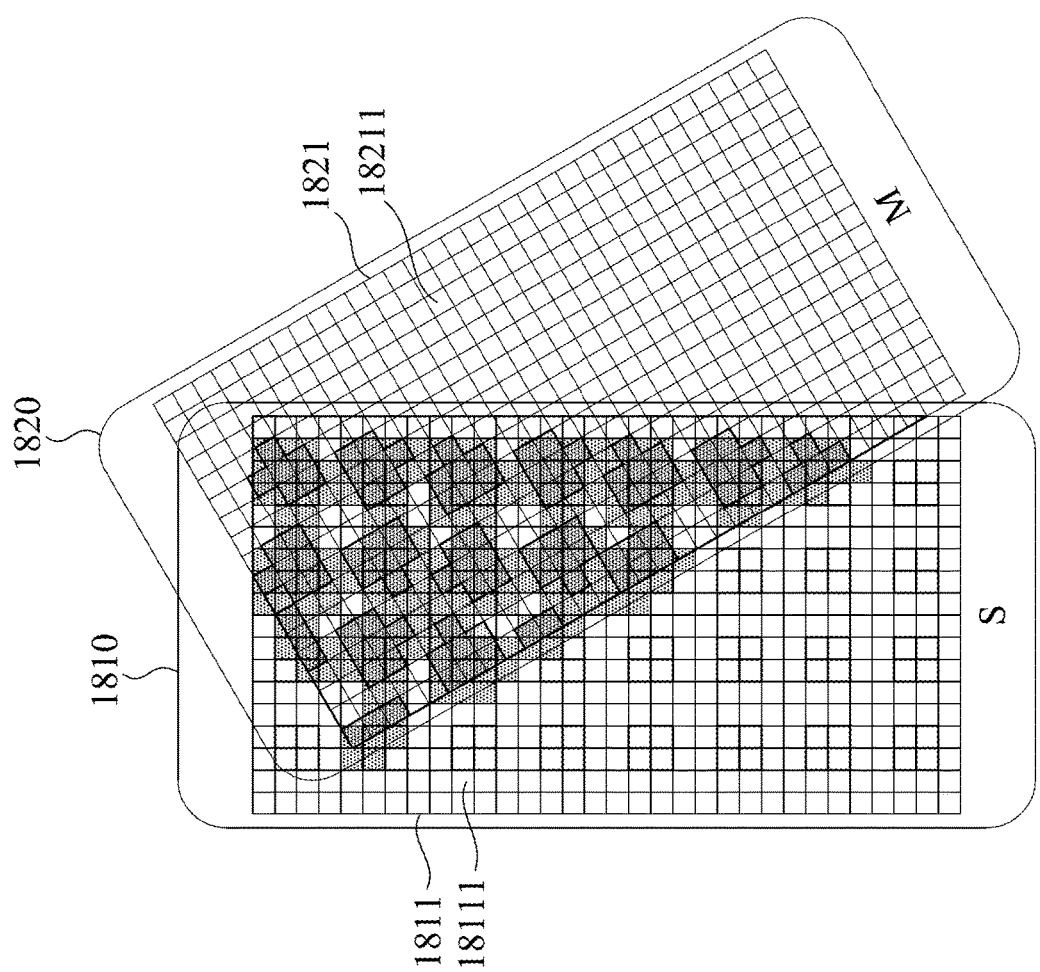
FIGS. 2G-2H are schematic diagrams illustrating an operation of the data transmission system according to some embodiments of the present disclosure.
Figure 2H:
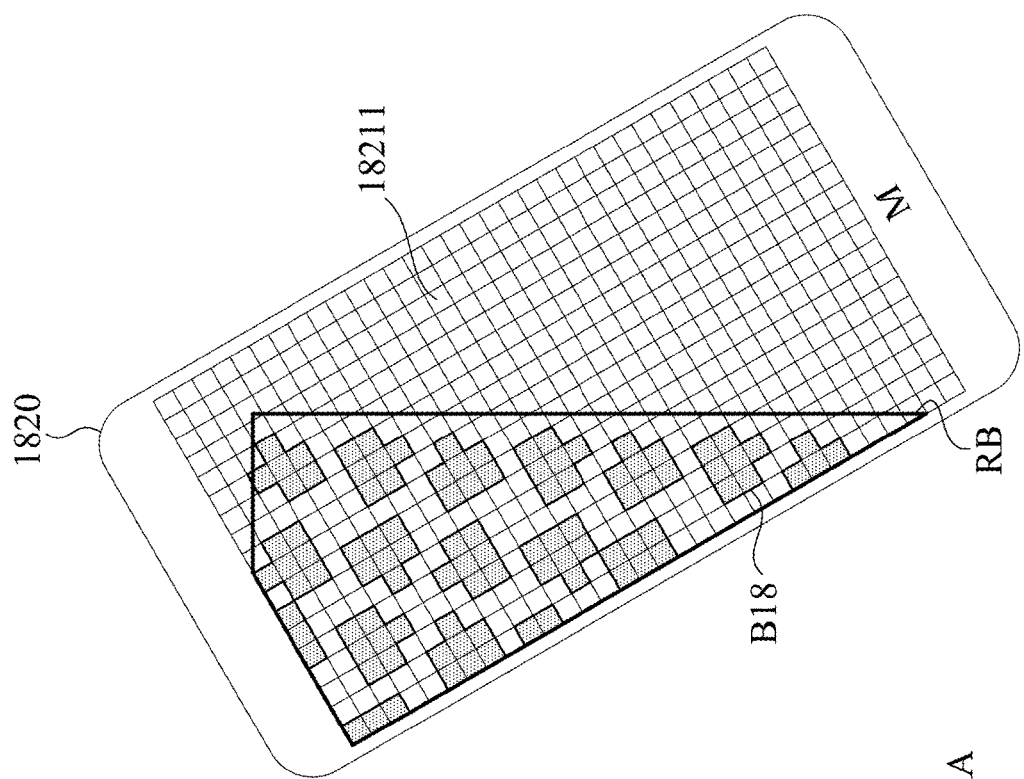
Figure 2H:
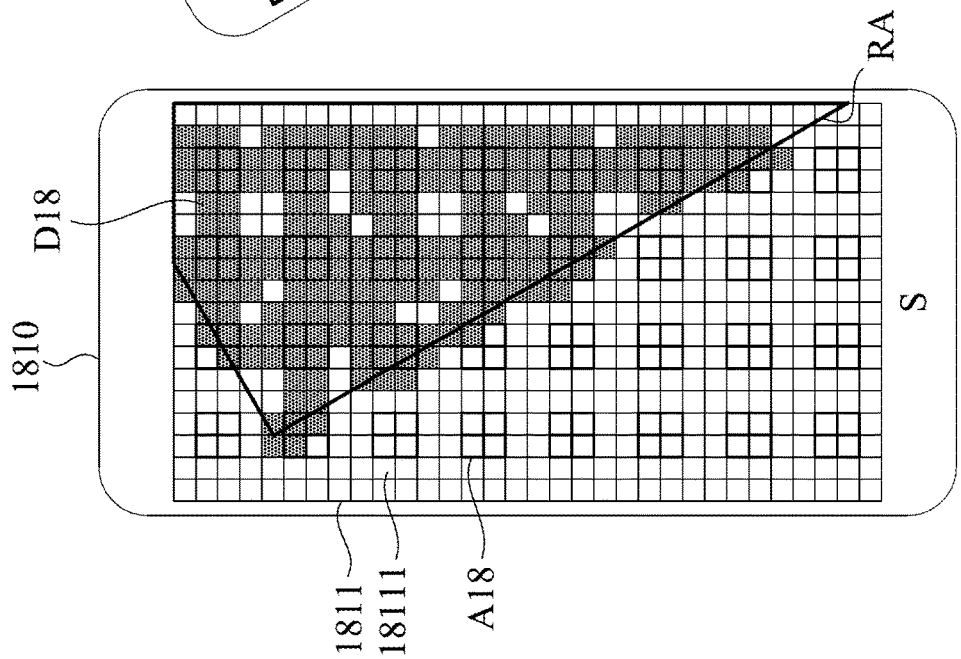

As illustrated In FIG. 2G and FIG. 2H, the electrodes 18111 in a receiving range D18 on the touch panel 1811 can receive sensing signals corresponding to the transmitting signals from the receiving areas B18.

In some embodiments, the operation state of the touch device 1810 and the operation state of the touch device 1820 can be exchanged according to a working period.

In some embodiments, a near-field communication (NFC) module of one touch device (e.g., the touch device 1810) transmits signals to a NFC module of another touch device (e.g., the touch device 1820). Then, the NFC module of the another touch device (e.g., the touch device 1820) transmits signals to the processor of the another touch device (e.g., the touch device 1820) to switch the operating state of the another touch device (e.g., the touch device 1820) to a correct operating state.

In some embodiments, the operating state of the touch device 1810 is switched periodically (switched between a transmitting state and a receiving state periodically). The touch device 1820 performs the aforementioned handshake process with the touch device 1810 when the touch device 1820 receives a correct signal.

Figure 2I:
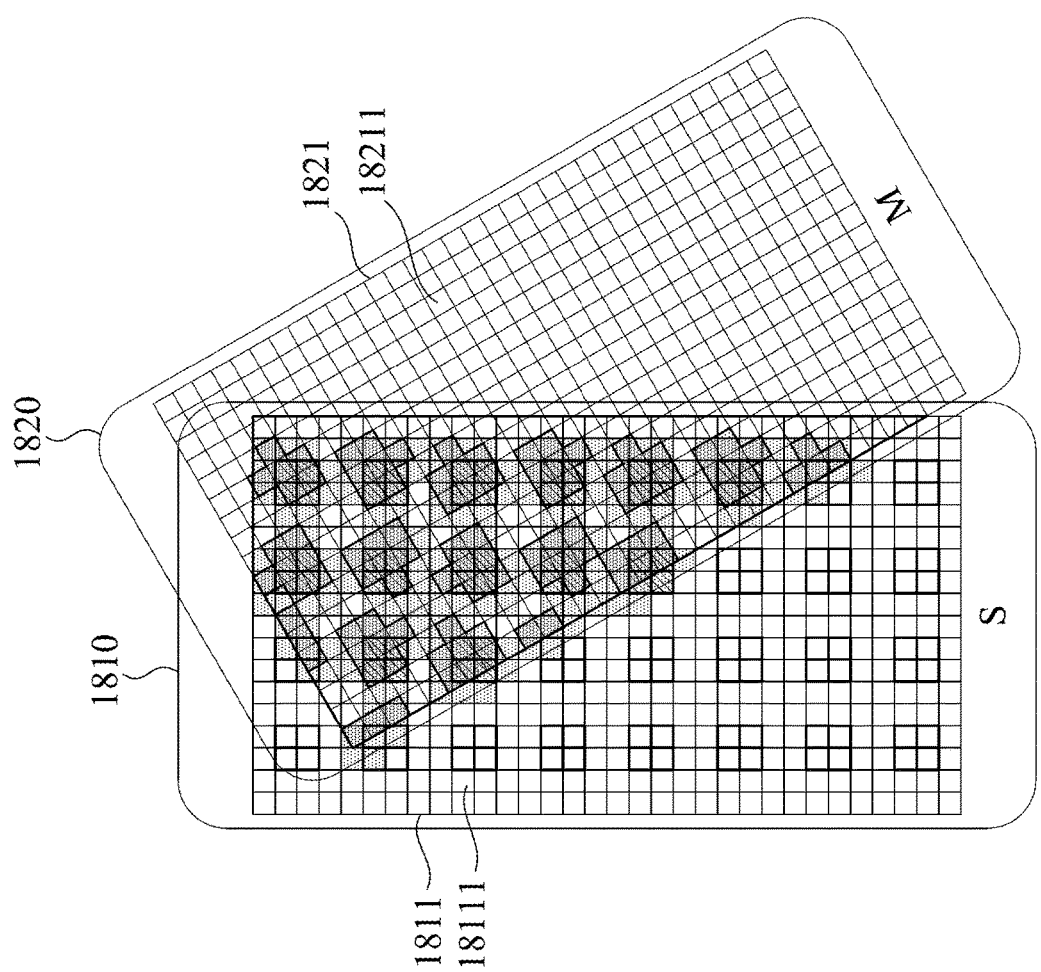
FIGS. 2I-2J are schematic diagrams illustrating an operation of the data transmission system according to some embodiments of the present disclosure.
Figure 2J:
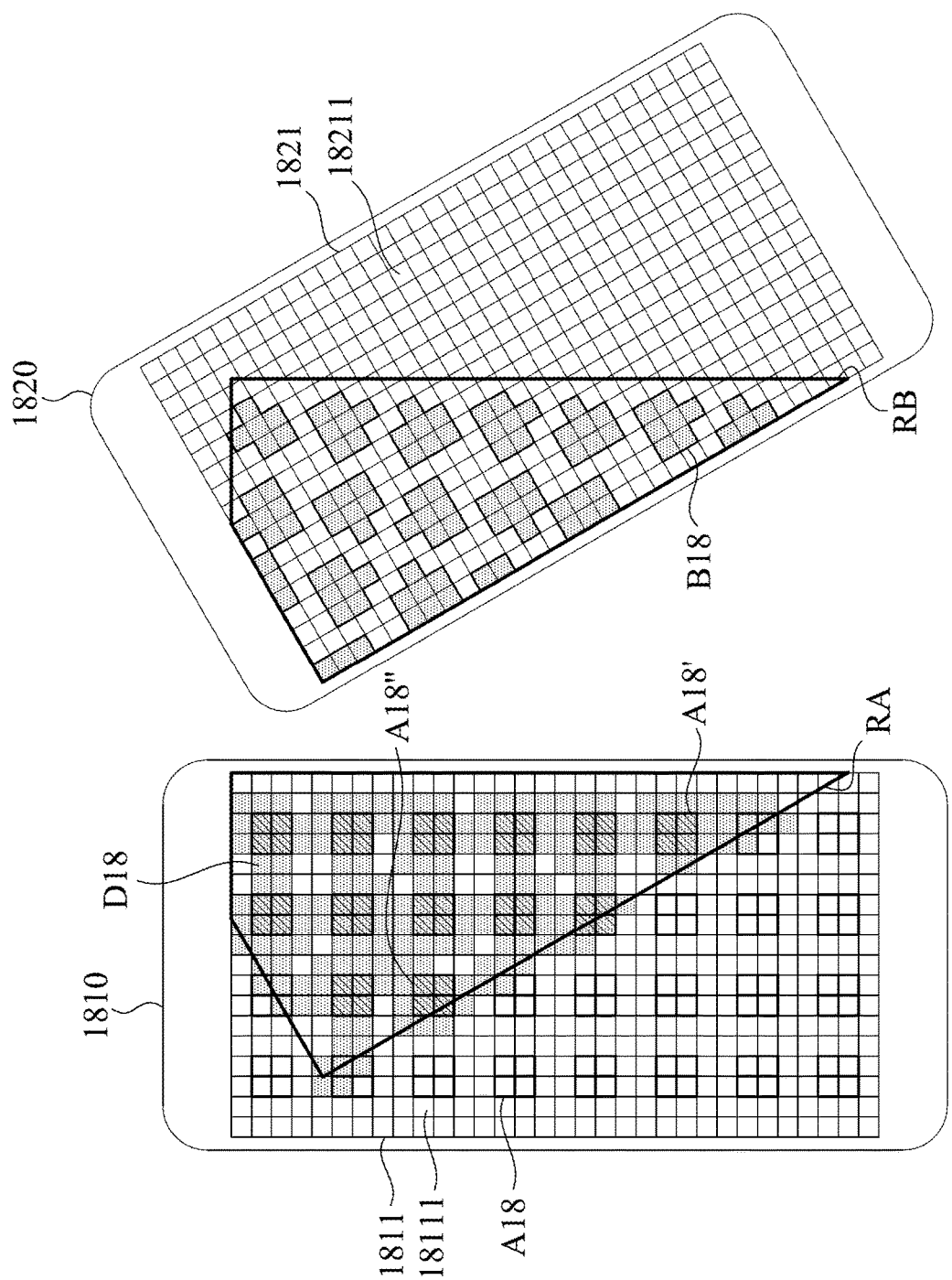

As illustrated in FIG. 2I and FIG. 2J, the electrodes 18111 outside the overlap range RA may receive weak signals, but signal intensity of the sensing signals received by the one or the multiple receiving areas A18 in the overlap range RA is larger than another signal intensity threshold value. Accordingly, the processor in the touch device 1820 can set another signal intensity threshold value, select the one or the multiple original transmitting areas A18 in the overlap range RA (there are multiple original transmitting areas A18 in the overlap range RA in FIG. 2I and FIG. 2J) according to the signal intensity of the received sensing signals and the another signal intensity threshold value, and determine the one or the multiple original transmitting areas A18 in the overlap range RA to be final transmitting areas A18'. In some embodiments, there is at least one transmitting areas A18" in the transmitting areas A18, and not all part of the transmitting areas A18" is in the overlap range RA (e.g., most part of the transmitting areas A18" is in the overlap range RA, but not all part of the transmitting areas A18" in the overlap range RA). The processor in the touch device 1820 can determine the one or the multiple receiving areas B18 in the overlap range RB to be final receiving areas (hereafter the final receiving areas B18).

Figure 2K:
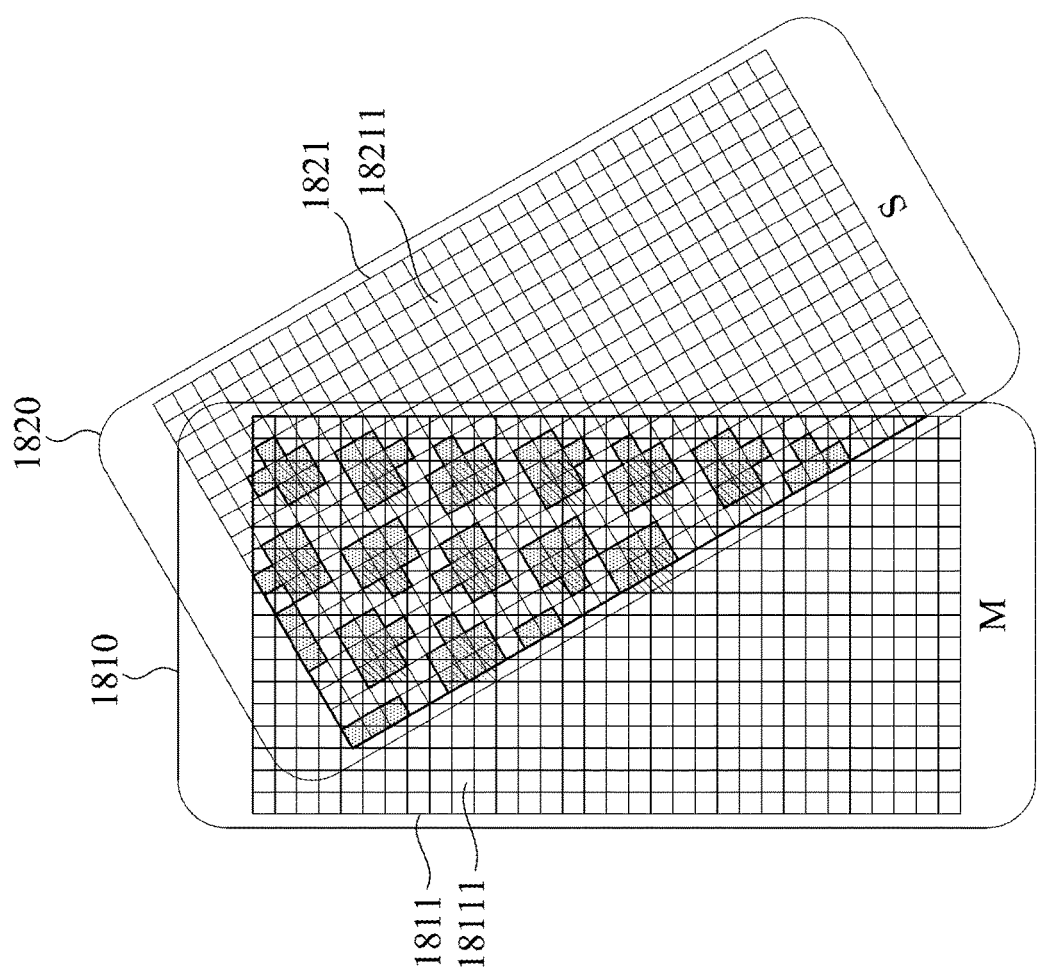
FIGS. 2K-2L are schematic diagrams illustrating an operation of the data transmission system according to some embodiments of the present disclosure.
Figure 2L:
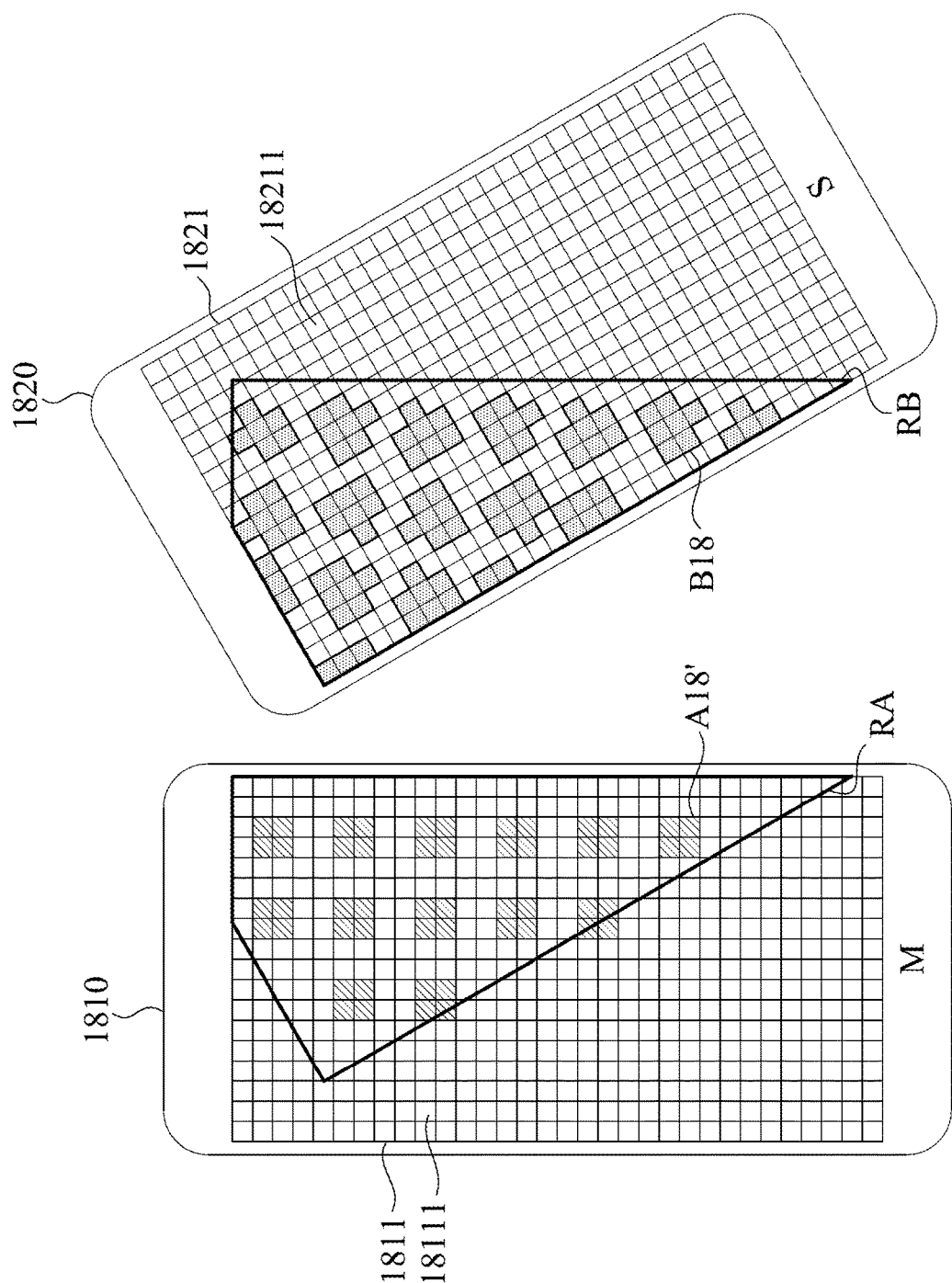

The final receiving areas B18 and the final transmitting areas A18' are better positions for transmitting/receiving data or signals. After the final receiving areas B18 and the final receiving areas A18' are determined, data transmission process between the touch devices 1810 and 1820 can be performed. As illustrated in FIG. 2K and FIG. 2L, operations of the touch device 1810 and the touch device 1820 are exchanged again. Explained in another way, the touch device 1810 operates as the master device M and the touch device 1820 operates as the slave device S. In other words, the touch device 1810 operates in the transmitting state and the touch device 1820 operates in the receiving state. Then, when the touch panel 1821 contacts or is significantly close to the touch panel 1811 by face-to-face (e.g., panel-to-panel), the electrodes 18111 in the final transmitting areas A18' can transmit a data transmission signal (e.g., image or file, but the present disclosure is not limited thereto), and the electrodes 18211 in the final receiving areas B18 can receive corresponding data sensing signal to complete the data transmission process between the touch device 1810 and the touch device 1820. As described above, the final receiving areas B18 and the final transmitting areas A18' are determined as better positions for transmitting/receiving data or signal. Thus, communication between the touch device 1810 and the touch device 1820 can be enhanced such that transmission efficiency is increased and interference can be reduced. In addition, the touch device 1810 and the touch device 1820 do not need to be completely aligned for data transmission.

In some embodiments, each of the final transmitting areas A18' can indicate a bit. Effectively, the touch device 1810 can transmit data or signals with multiple bits (e.g., 13 bits). Compared to a single transmitting area (single bit), the transmission efficiency can be improved by 13 times.

In some embodiments, when the data transmission process between the touch device 1810 and the touch device 1820 is finished, the touch device 1820 sends an end signal to the touch device 1810. Then, the touch device 1810 and the touch device 1820 operate in the normal touch mode to perform the touch sensing process or the fingerprint recognition process.

In some embodiments, each of electrodes 18111 (18121) on the touch panel 1811 (1821) not only transmit signals but also receive signals. During the data transmission process between the touch device 1810 and the touch device 1820, the electrodes 18111 in the final transmitting areas A18' operate in the transmitting state and the electrodes 18211 in the final receiving areas B18 operates in the receiving state, until the data transmission process is completed. During the touch sensing process or the fingerprint recognition process of the touch device 1810 or the touch device 1820, the state switching (transmitting state or receiving state) can be performed by a time-sharing manner.

In some embodiments, a part of the electrodes 18111 (18121) in the touch panel 1811(1821) is used to transmit signals, and a part of the electrodes 18111 (18121) in the touch panel 1811(1821) is used to receive signals. In these embodiments, corresponding electrodes can be enabled according to current needs.

Figure 3A:
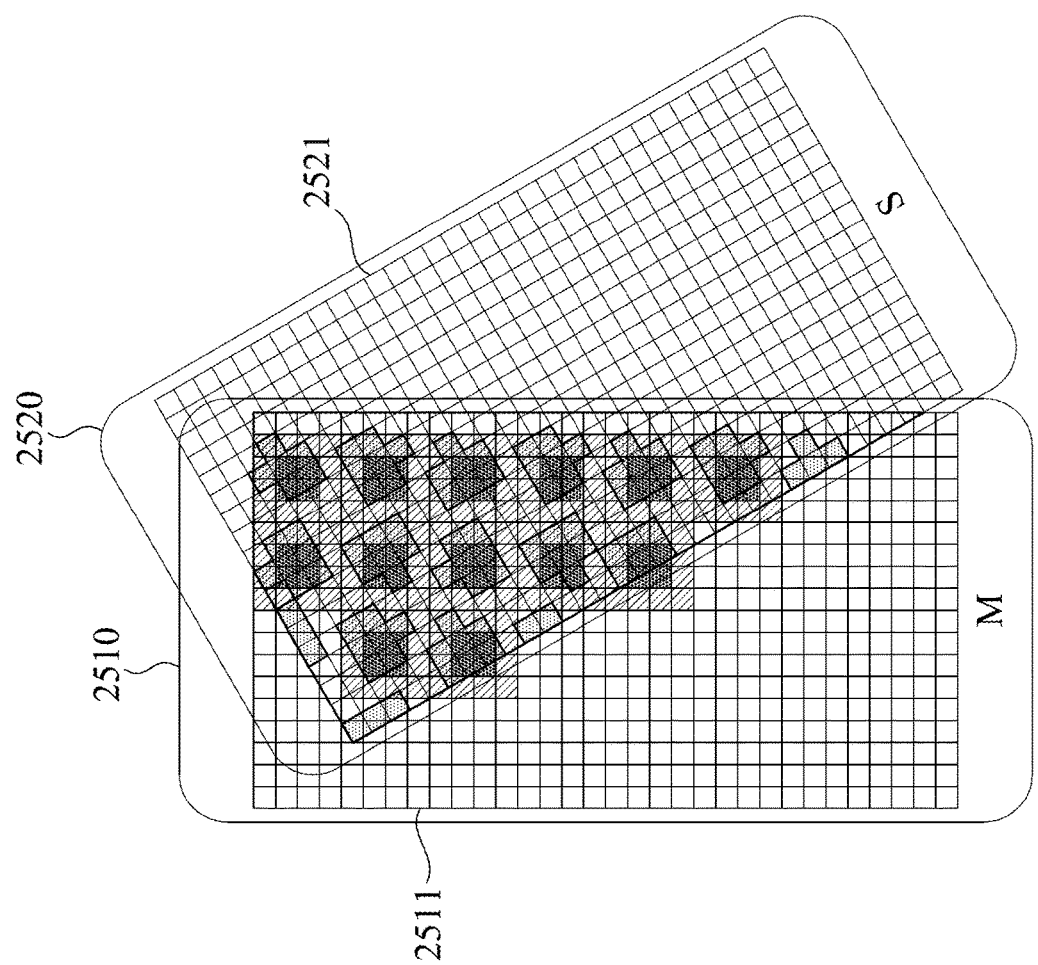
FIGS. 3A-3B are schematic diagrams illustrating a data transmission system according to some embodiments of the present disclosure.
Figure 3B:
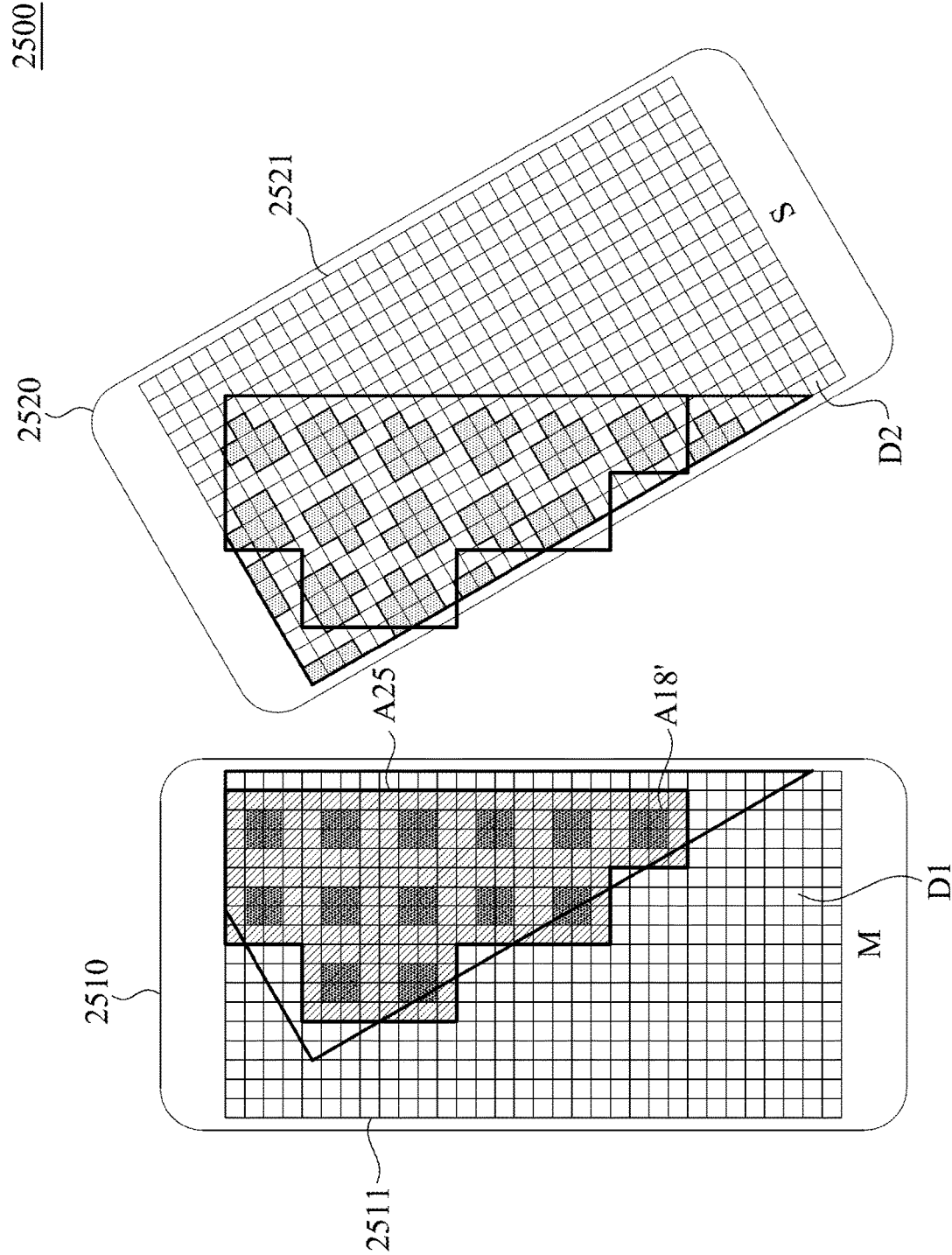

References are made to FIG. 3A and FIG. 3B. FIG. 3 and FIG. 3B are schematic diagrams illustrating a data transmission system 2500 according to some embodiments of the present disclosure.

As illustrated in FIG. 3A and FIG. 3B, the data transmission system 2500 includes a touch device 2510 and a touch device 2520. The touch device 2510 includes a touch panel 2511, and the touch device 2520 includes a touch panel 2521. The touch devices 2510 and 2520 are similar to the touch devices 1810 and 1820 in FIG. 2K and FIG. 2L. One of major differences between FIG. 3B and FIG. 2L is that, in FIG. 3B, a final transmitting area A25 covers all of the final transmitting areas A18', and a cover range of the final transmitting area A25 is larger than a total cover range of the final transmitting areas A18'. The final transmitting area A25 is used to transmit data or signals to the touch device 2520. Since the final transmitting area A25 is larger, interference can be reduced and signal integrity can be better.

In addition, the touch panel 2511 includes a dummy area D1. The dummy area D1 can transmit dummy signals, do not operate, or transmit complementary signals (e.g., the phase of the signals in the dummy area D1 is complementary to the phase of the signals in the transmitting area A25). Correspondingly, the touch panel 2521 includes a dummy area D2. The dummy area D2 can transmit dummy signals or do not operate.

Figure 4:
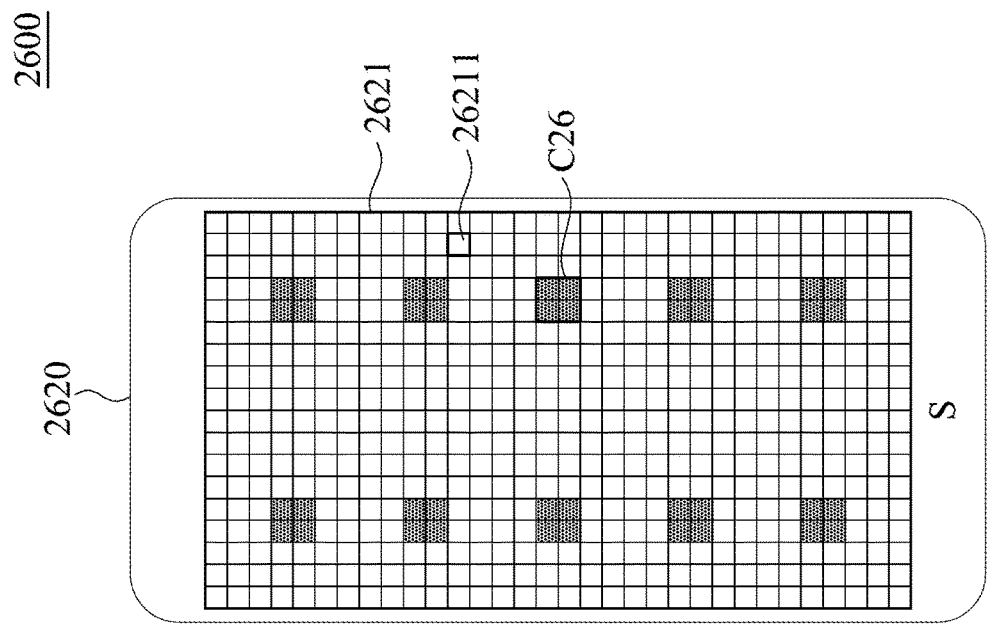
FIG. 4 is a schematic diagram illustrating a data transmission system according to some embodiments of the present disclosure.
Figure 4:
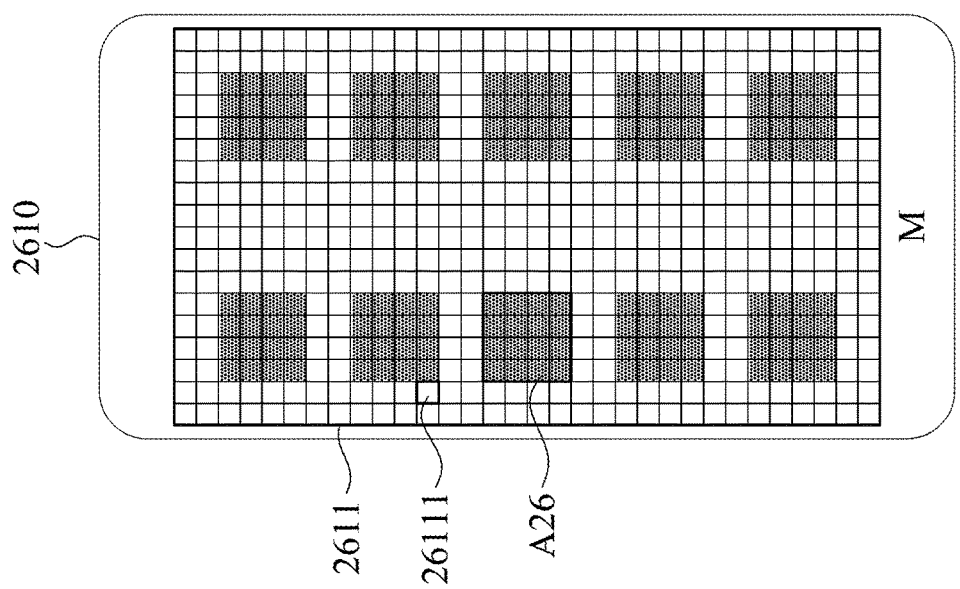

Reference is made to FIG. 4. FIG. 4 is a schematic diagram illustrating a data transmission system 2600 according to some embodiments of the present disclosure.

As illustrated in FIG. 4, the data transmission system 2600 includes a touch device 2610 and a touch device 2620. In some embodiments, the touch device 2610 operates as a master device M, and the touch device 2620 operates as a master device S. The touch device 2610 includes a touch panel 2611, and the touch device 2620 includes a touch panel 2621. In FIG. 4, a specific pattern on the touch panel 2611 corresponds to multiple original transmitting areas A26, each of the original transmitting areas A26 is in a square-shape, and each of the original transmitting areas A26 includes multiple electrodes 26111 (e.g., 16 electrodes 26111). A number value of the electrodes 26111 (e.g., 16 electrodes 26111) in one original transmitting areas A26 is greater than a number value of electrodes 26211 (e.g., 4 electrodes 26211) in a receiving area C26. Effectively, a size of each of the original transmitting areas A26 is larger than a size of each of the sensing areas C26 (the size of each of the sensing areas C26 is identical to a size of each of the original transmitting areas A17 in FIG. 1). In this example, since the original transmitting area A26 is larger, interference can be reduced and signal integrity can be better.

Figure 5:
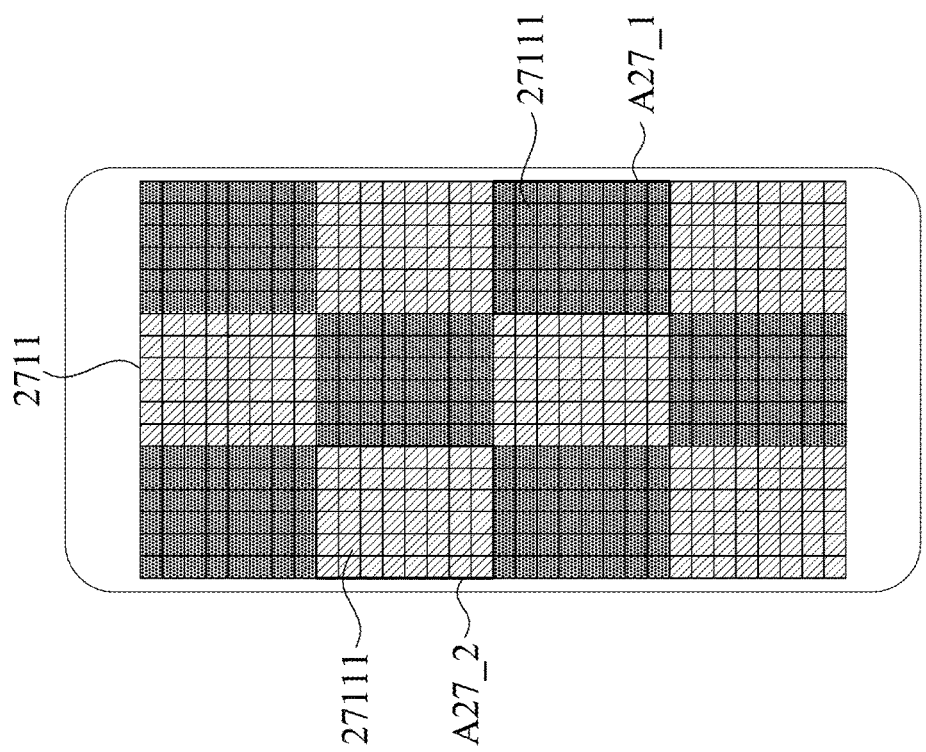
FIG. 5 is a schematic diagram illustrating a touch device according to some embodiments of the present disclosure.

Reference is made to FIG. 5. FIG. 5 is a schematic diagram illustrating a touch device 2710 according to some embodiments of the present disclosure. The touch device 2710 in FIG. 5 is similar to the touch device 1710 in FIG. 1.

As illustrated in FIG. 5, the touch device 2710 includes a touch panel 2711. A specific pattern on the touch panel 2711 corresponds to multiple original transmitting areas A27_1 and multiple original transmitting areas A27_2, electrodes 27111 in the original transmitting areas A27_1 (first group in the electrodes 27111) can transmit transmitting signals with a first frequency, and electrodes 27111 in the original transmitting areas A27_2 (second group in the electrodes 27111) can transmit transmitting signals with a second frequency. The second frequency is different from the first frequency.

Figure 6:
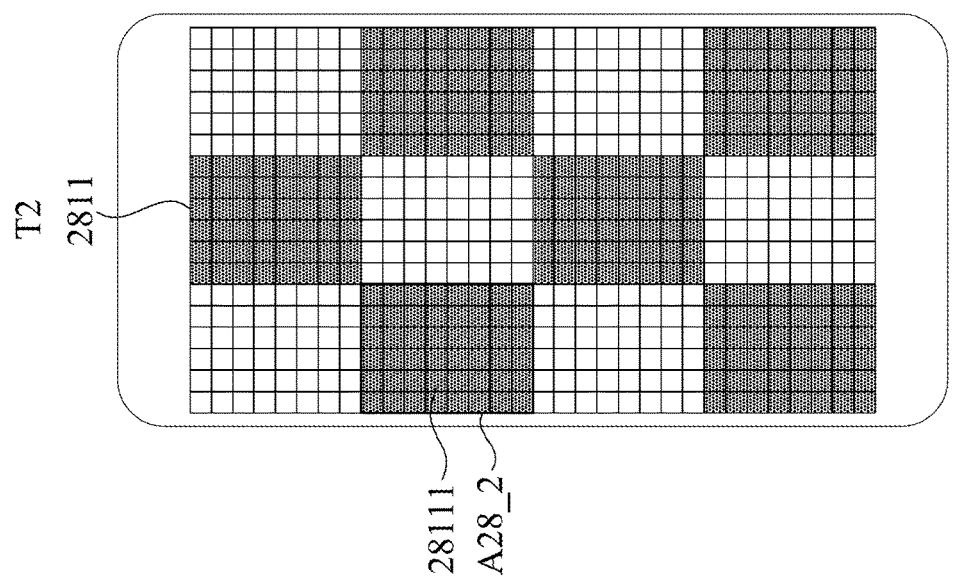
FIG. 6 is a schematic diagram illustrating a touch device according to some embodiments of the present disclosure.
Figure 6:
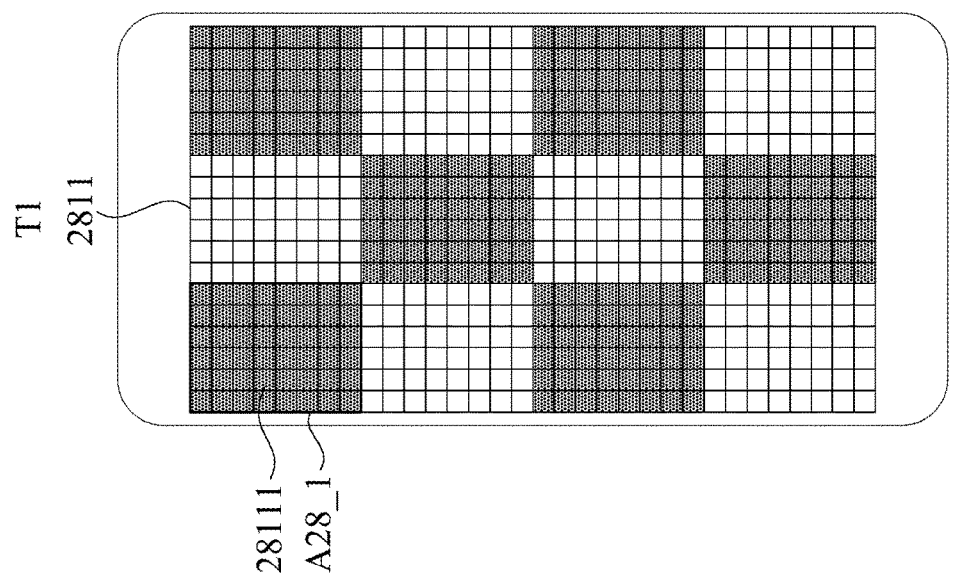

Reference is made to FIG. 6. FIG. 6 is a schematic diagram illustrating a touch device 2810 according to some embodiments of the present disclosure. The touch device 2810 in FIG. 6 is similar to the touch device 1710 in FIG. 1.

As illustrated in FIG. 6, the touch device 2810 includes a touch panel 2811. A specific pattern on the touch panel 2811 corresponds to multiple original transmitting areas A28_1 and multiple original transmitting areas A28_2, electrodes 28111 in the original transmitting areas A28_1 (first group in the electrodes 28111) can transmit transmitting signals with a first frequency during a first time interval, and electrodes 28111 in the original transmitting areas A28_2 (second group in the electrodes 28111) can transmit transmitting signals with the first frequency during a second time interval. In other words, the original transmitting areas A28_1 and the original transmitting areas A28_2 can transmit the transmitting signals with the same frequency but operate during different time intervals.

The touch device 2710 in FIG. 5 uses frequency-division mechanism, and the touch device 2810 in FIG. 6 uses time-division mechanism. Thus, they can achieve effect of anti-interference.

Figure 7:
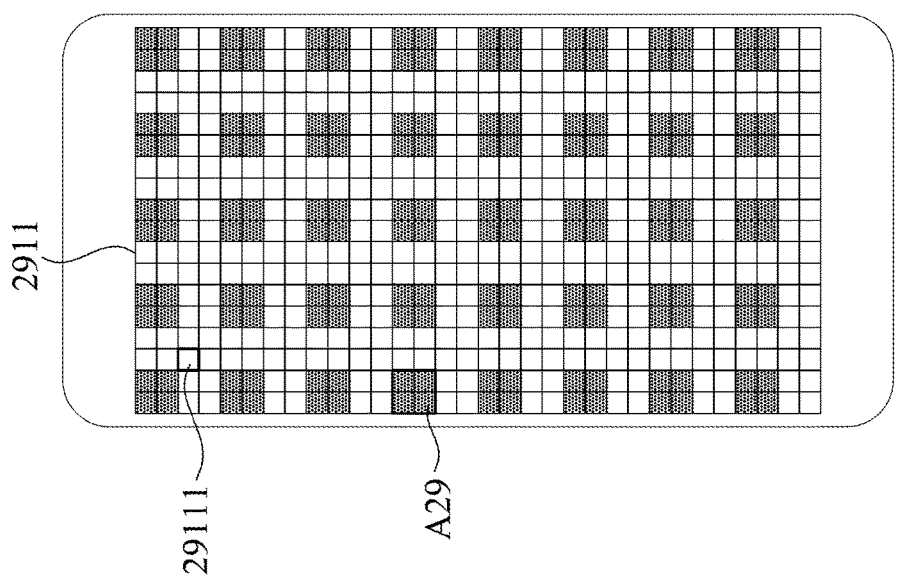
FIG. 7 is a schematic diagram illustrating a touch device according to some embodiments of the present disclosure.

Reference is made to FIG. 7. FIG. 7 is a schematic diagram illustrating a touch device 2910 according to some embodiments of the present disclosure. The touch device 2910 in FIG. 7 is similar to the touch device 1710 in FIG. 1. As illustrated in FIG. 7, the touch device 2910 includes a touch panel 2911. A specific pattern on the touch panel 2911 corresponds to multiple original transmitting areas A29 (each includes 4 electrodes 29111 and is in a square-shape). As illustrated in FIG. 7, the touch panel 2911 has 40 original transmitting areas A29 (e.g., 40 bits). Compared to a single transmitting area (single bit), the transmission efficiency can be improved by 40 times.

Figure 8:
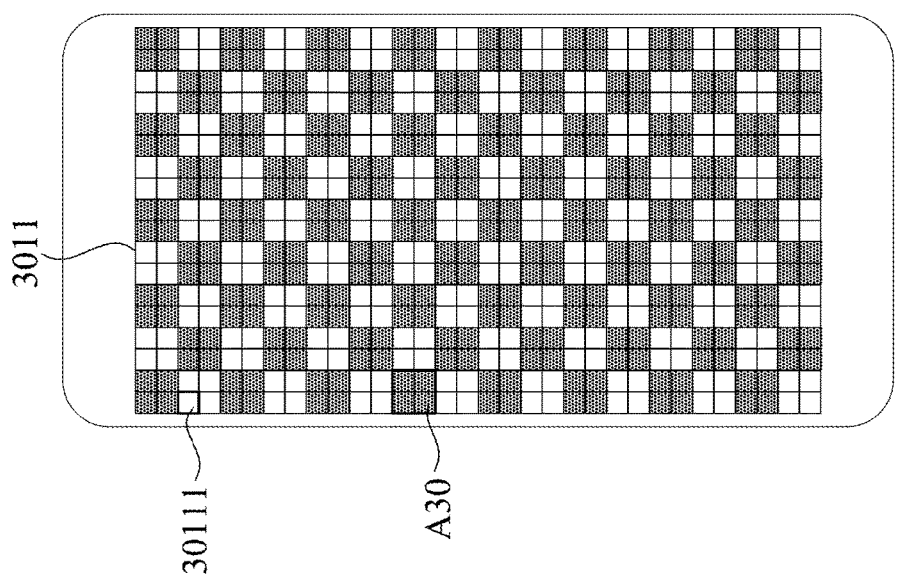
FIG. 8 is a schematic diagram illustrating a touch device according to some embodiments of the present disclosure.

Reference is made to FIG. 8. FIG. 8 is a schematic diagram illustrating a touch device 3010 according to some embodiments of the present disclosure. The touch device 3010 in FIG. 8 is similar to the touch device 1870 in FIG. 1. As illustrated in FIG. 8, the touch device 3010 includes a touch panel 3011. A specific pattern on the touch panel 3011 corresponds to multiple original transmitting areas A30 (each includes 4 electrodes 30111 and is in a square-shape). As illustrated in FIG. 8, the touch panel 3011 has 72 original transmitting areas A30 (e.g., 72 bits). Compared to a single transmitting area (single bit), the transmission efficiency can be improved by 72 times.

Figure 9:
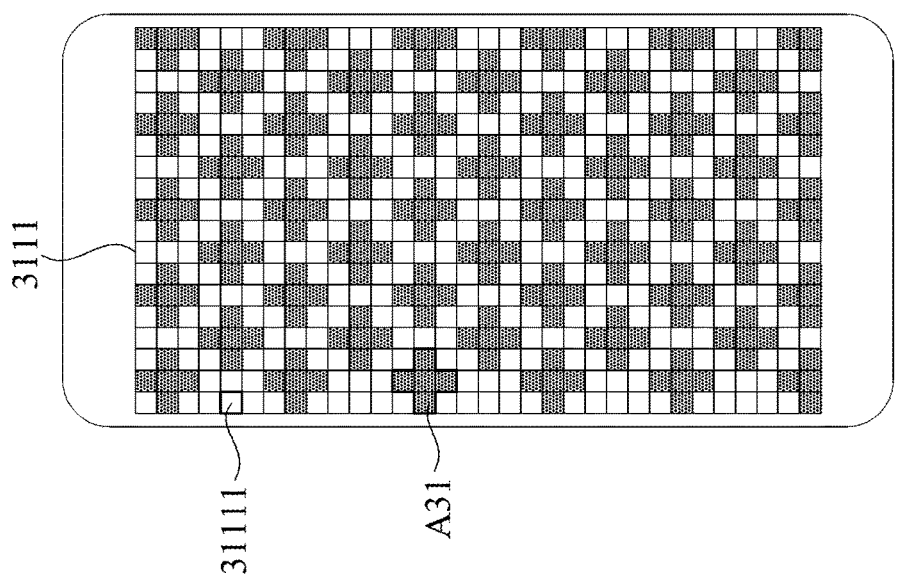
FIG. 9 is a schematic diagram illustrating a touch device according to some embodiments of the present disclosure.

Reference is made to FIG. 9. FIG. 9 is a schematic diagram illustrating a touch device 3110 according to some embodiments of the present disclosure. The touch device 3110 in FIG. 9 is similar to the touch device 1710 in FIG. 1. As illustrated in FIG. 9, the touch device 3110 includes a touch panel 3111. A specific pattern on the touch panel 3111 corresponds to multiple original transmitting areas A31 (each includes 4 electrodes 31111 and is in a cruciform-shape). As illustrated in FIG. 9, the touch panel 3111 has 50 original transmitting areas A31 (e.g., 50 bits). Compared to a single transmitting area (single bit), the transmission efficiency can be improved by 50 times.

Figure 10:
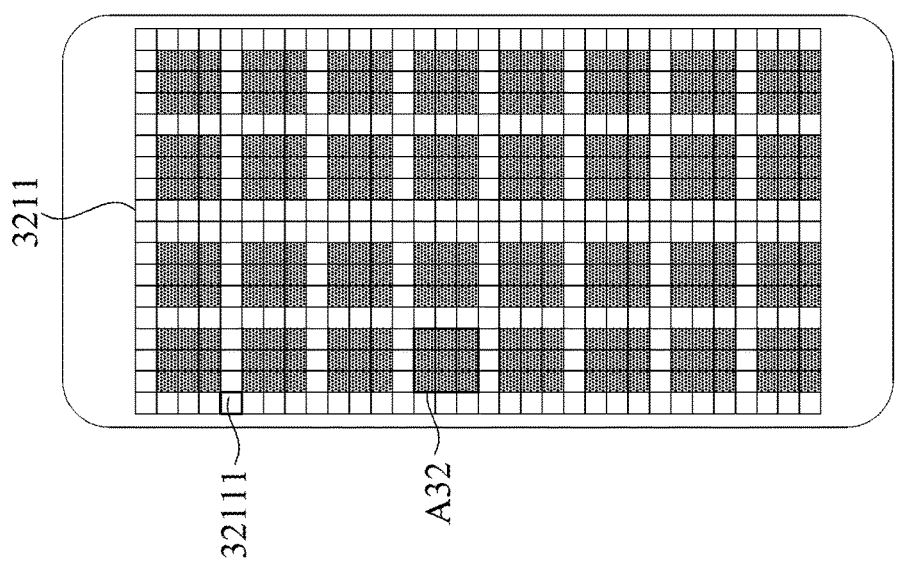
FIG. 10 is a schematic diagram illustrating a touch device according to some embodiments of the present disclosure.

Reference is made to FIG. 10. FIG. 10 is a schematic diagram illustrating a touch device 3210 according to some embodiments of the present disclosure. The touch device 3210 in FIG. 10 is similar to the touch device 1710 in FIG. 1. As illustrated in FIG. 10, the touch device 3210 includes a touch panel 3211. A specific pattern on the touch panel 3211 corresponds to multiple original transmitting areas A32 (each includes 9 electrodes 32111 and is in a square-shape). As illustrated in FIG. 10, the touch panel 3211 has 32 original transmitting areas A32 (e.g., 32 bits). Compared to a single transmitting area (single bit), the transmission efficiency can be improved by 32 times. A size of each of the original transmitting areas A32 is greater than a size of each of the original transmitting areas A29 in FIG. 7.

In some embodiments, a phase-shift modulation method can be introduced into different transmitting areas to increase data amount. The phase-shift modulation method is, for example, BPSK, QPSK, or other phase-shift modulation method.

Figure 11:
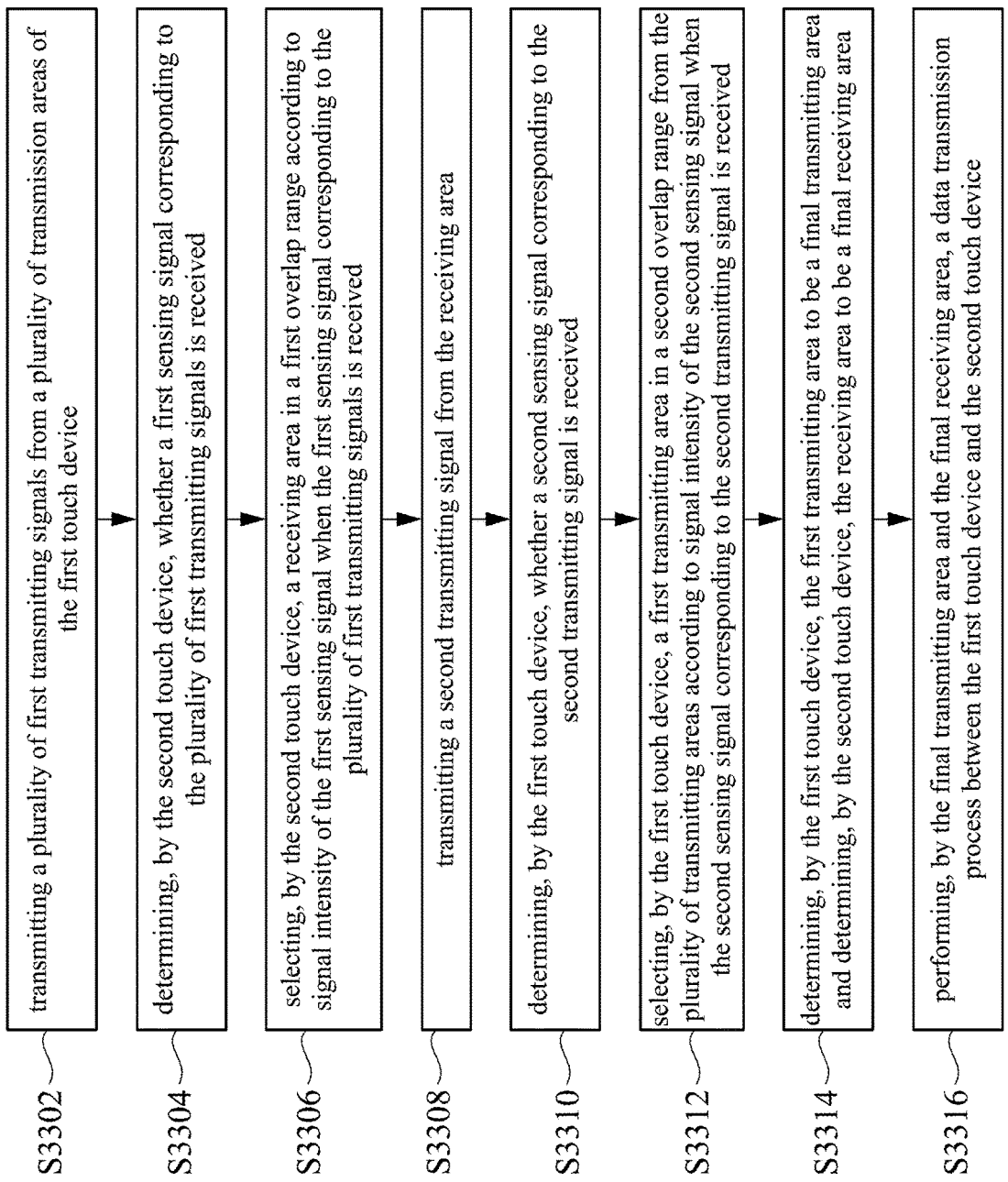
FIG. 11 is a flow diagram illustrating a data transmission method according to some embodiments of the present disclosure.

Reference is made to FIG. 11. FIG. 11 is a flow diagram illustrating a data transmission method 3300 according to some embodiments of the present disclosure. For ease of understanding, the data transmission method 3300 are described with reference to FIG. 2A to FIG. 2L, but the present disclosure is not limited thereto.

As illustrated in FIG. 11, the data transmission method 3300 includes operation S3302, operation S3304, operation S3306, operation S3308, operation S3310, operation S3312, operation S3314, and operation S3316.

In operation S3302, the original transmitting areas A18 of the touch device 1810 transmit the transmitting signals. In some embodiments, the electrodes 18111 in the original transmitting areas A18 can transmit the transmitting signals with the first frequency. In operation S3304, the touch device 1820 determines whether a corresponding sensing signal is received. Since some electrodes 18211 outside the overlap range RB receives weak signals, the touch device 1820 selects the receiving areas B18 in the overlap range RB according to the signal intensity of the sensing signal in operation S3306. For example, the touch device 1820 can select the receiving area B18 in the overlap range RB according to one signal intensity threshold value and the signal intensity of the sensing signal. In operation S3308, the selected receiving area B18 transmits transmitting signals. In operation S3310, the touch device 1810 determines whether a corresponding sensing signal is received. In operation S3312, when the corresponding sensing signal is received, the touch device 1810 selects the transmitting area A18 in the overlap range RA from the transmitting areas A18 according to the signal intensity of the sensing signal. For example, the touch device 1810 can select the transmitting area A18 in the overlap range RA according to another signal intensity threshold value and the signal intensity of the sensing signal.

Then, in operation S3314, the touch device 1810 determines the selected transmitting areas A18 to be the final transmitting areas A18', and the touch device 1820 determines the selected receiving area B18 to be the final receiving areas. In operation S3316, the final transmitting areas A18' and the final receiving areas B18 perform the data transmission process between the touch device 1810 and the touch device 1820.

In some embodiments, the data transmission signal in the aforementioned data transmission process can be an invisible barcode. In other words, the touch device 1810 can be an invisible barcode transmitter, and the touch device 1820 can be an invisible barcode receiver.

Since a user cannot see the shape of the invisible barcode. Thus, compared to other visible code (e.g., one-dimensional barcode, QR code), the security of invisible barcode is higher.

How to generate the invisible barcode are described in following paragraphs.

In some embodiments, an application program in the touch device 1810 can generate the invisible barcode according to a touch chip in the touch device 1810. This invisible barcode can be identified by the same touch chip or other compatible touch chips.

In some other embodiments, an application program in the touch device 1810 can generate the invisible barcode according to received authentication information sent from a server and an authentication code in the touch device.

In some other embodiments, an application program in the touch device 1810 can generate the invisible barcode according to a touch chip in the touch device 1810 and an operation of a user (the operation can be determined by the user, not limited to an unlocking operation).

The unlocking operation is taken as an example for better understanding.

The touch device 1810 (master device) can utilize the invisible barcode to unlock another touch device 1820 (slave device). In this application, the master device is a barcode transmitter, and the slave device is a barcode receiver. In other words, the electrodes on the touch panel in the slave device can receive corresponding sensing signals, and the processor in the slave device can determine whether to be unlocked according to the sensing signals.

In some embodiments, the master device can be a cell phone, and the cell phone can utilize the invisible barcode to unlock a smart TV. In some other embodiments, the touch device 1820 can be a smart watch, and the smart watch can utilize the invisible barcode to unlock a cell phone or a door lock with a touch panel. However, the present disclosure is not limited thereto.

In some related approaches, if the user would like to utilize the invisible code on the master device to log in the slave device (or the user shares the login information of the master device to the slave device such that the slave device can log in a specific service automatically), the user needs to unlock the slave device first, and then log into the specific service. Compared to the related approaches, this invisible barcode on the master device can be utilized to unlock the slave device and log into the specific service simultaneously. To be more specific, the unlock information and the login information (e.g., a URL) can be transmitted in an invisible barcode from the master device to a processing chip (e.g., a touch chip or a display chip) in the slave device, and the processing chip in the slave device can be connected to the specific service directly according to the logging information (e.g., a URL).

A first method how the master device communicates to the slave device is described below. The slave device sends a request periodically to the master device. The master device can send an acknowledge signal (ACK) in response to the request. After the slave device receives the acknowledge signal, the slave device can communicate with the master device. For example, information about the invisible barcode can be transmitted between the master device and the slave device, and the information includes a format, encode information, a transmission frequency, a clock rate, or other information. After the slave device receives the information and the authentication between the master device and the slave device are checked, the information transmission is stopped and the slave device can decode the information and perform correspond operations.

A second method how the master device communicates to the slave device is described below. A first wireless system in the master device can transmit parameters to a second wireless system in the slave device. The first wireless system can be Bluetooth or NFC, and the second wireless system can be a touch panel for transmitting or receiving RF signals. After the slave device receives the parameters, the slave device can perform corresponding operations.

In other embodiments, the master device can be a wearable electronic device, such as a smart bracelet or a smart watch. The slave device can be an inter-connected electronic device, such as a computer, a display device, a multimedia interactive machine, a touch combination lock, etc.

A user can perform the fingerprint identification through the touch panel of a wearable device first. According to the user's need, a processor disposed in the wearable device can generate an invisible barcode based on the user's fingerprint characteristics, and upload the invisible barcode to a server. The slave device confirms to the server whether there is information corresponding to the slave device. When the slave device acquires the invisible barcode from the server, a controller disposed in the slave device interprets the function corresponding to the invisible barcode. When a touch panel disposed in the slave device detects that it matches an invisible barcode on the master device, the slave device performs the corresponding function.

To be more specific, the user wears a smart watch, and the user touches the fingerprint identification touch panel of the smart watch. A processor in the smart watch generates a corresponding invisible barcode and uploads the invisible barcode to a server. Then, the user brings the smart watch close to a touch panel in a touch combination lock disposed on a door. When the touch panel receives the invisible barcode, the touch combination lock is unlocked. In another embodiment, a user uses an application program which is installed in his smart watch and corresponds to his electric vehicle to generate an invisible barcode based on his fingerprint, and the invisible barcode can be used to start his electric vehicle. In a condition that the user brings the invisible barcode close to a touch panel of the electric vehicle, after a processor disposed in the electric vehicle checks it, the electric vehicle is started.

The aforementioned method can store the user's password information in the master device, so as to avoid that each slave device has the user's confidential information. This can reduce the possibility of the confidential information being leaked from the slave devices.

Based on the descriptions above, in the present disclosure, two touch devices can be paired to determine the final transmitting area and the final receiving area, and the data transmission process is performed by the final transmitting area and the final receiving area. Since the final transmitting area and the final receiving area are the better positions to transmit/receive signals, the communication between the two touch devices can be enhanced to improve the transmission efficiency.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A data transmission method for a first touch device and a second touch device, wherein the data transmission method comprises:
   transmitting a plurality of first transmitting signals from a plurality of transmitting areas of the first touch device;
   determining, by the second touch device, whether a first sensing signal corresponding to the plurality of first transmitting signals is received;
   selecting, by the second touch device, a receiving area in a first overlap range according to signal intensity of the first sensing signal when the first sensing signal corresponding to the plurality of first transmitting signals is received;
   transmitting a second transmitting signal from the receiving area;
   determining, by the first touch device, whether a second sensing signal corresponding to the second transmitting signal is received;
   selecting, by the first touch device, a first transmitting area in a second overlap range from the plurality of transmitting areas according to signal intensity of the second sensing signal when the second sensing signal corresponding to the second transmitting signal is received;
   determining, by the first touch device, the first transmitting area to be a final transmitting area and determining, by the second touch device, the receiving area to be a final receiving area; and
   performing, by the final transmitting area and the final receiving area, a data transmission process between the first touch device and the second touch device,
   wherein a number of electrodes in each of the plurality of transmitting areas is greater than a number of electrodes in the receiving area.

2. The data transmission method of claim 1, wherein a first group in the transmitting areas is to transmit the plurality of first transmitting signals with a first frequency, a second group in the transmitting areas is to transmit the plurality of first transmitting signals with a second frequency, and the second frequency is different from the first frequency.

3. The data transmission method of claim 1, wherein a first group in the transmitting areas is to transmit the plurality of first transmitting signals with a first frequency during a first time interval, and a second group in the transmitting areas is to transmit the plurality of first transmitting signals with the first frequency during a second time interval.

4. The data transmission method of claim 1, further comprising:
   transmitting, by the first touch device, a data transmission signal through the final transmitting area when the first touch device and the second touch device performs the data transmission process; and
   receiving, by the second touch device, a data sensing signal corresponding to the data transmission signal through the final receiving area.

5. The data transmission method of claim 4, wherein the data transmission signal corresponds to an invisible barcode.

6. The data transmission method of claim 1, wherein selecting, by the second touch device, the receiving area in the first overlap range according to the signal intensity of the first sensing signal comprises:
   setting, by the second touch device, a signal intensity threshold value; and
   selecting, by the second touch device, the receiving area in the first overlap range to be the final receiving area according to the signal intensity threshold value and the signal intensity of the first sensing signal.

7. A data transmission system, comprising:
   a first touch device comprising a plurality of transmitting areas to transmit a plurality of first transmitting signals; and
   a second touch device to determine whether a first sensing signal corresponding to the plurality of first transmitting signals is received and to select a receiving area in a first overlap range according to signal intensity of the first sensing signal to transmit a second transmitting signal,
   wherein the first touch device determines whether a second sensing signal corresponding to the second transmitting signal is received and selects a first transmitting area in a second overlap range from the plurality of transmitting areas according to signal intensity of the second sensing signal,
   wherein the first touch device determines the first transmitting area to be a final transmitting area and the second touch device determines the receiving area to be a final receiving area,
   wherein the final transmitting area and the final receiving area perform a data transmission process between the first touch device and the second touch device,
   wherein a number of electrodes in each of the plurality of transmitting areas is greater than a number of electrodes in the receiving area.

8. The data transmission system of claim 7, wherein the first touch device comprises:

a first touch panel comprising a plurality of first electrodes; and a first processor coupled to the first touch panel, wherein the first touch device performs a first touch sensing process or a first fingerprint recognition process when the first touch device operates in a touch mode.

9. The data transmission system of claim 8, wherein the second touch device comprises:

a second touch panel comprising a plurality of second electrodes; and a second processor coupled to the second touch panel, wherein the second touch device performs a second touch sensing process or a second fingerprint recognition process when the second touch device operates in the touch mode.

10. The data transmission system of claim 7, wherein a first group in the transmitting areas is to transmit the plurality of first transmitting signals with a first frequency, a second group in the transmitting areas is to transmit the plurality of first transmitting signals with a second frequency, and the second frequency is different from the first frequency.

11. The data transmission system of claim 7, wherein a first group in the transmitting areas is to transmit the plurality of first transmitting signals with a first frequency during a first time interval, and a second group in the transmitting areas is to transmit the plurality of first transmitting signals with the first frequency during a second time interval.

12. The data transmission system of claim 7, wherein when the first touch device and the second touch device performs the data transmission process, the first touch device transmits a data transmission signal through the final transmitting area and the second touch device receives a data sensing signal corresponding to the data transmission signal through the final receiving area.

13. The data transmission system of claim 12, wherein the data transmission signal corresponds to an invisible barcode.

14. The data transmission system of claim 7, wherein each of the plurality of transmitting areas is in a square-shape or in a cruciform-shape.

15. A processor, wherein when a plurality of transmitting areas of a first touch device transmit a plurality of first transmitting signals, the processor in a second touch device determines whether a first sensing signal corresponding to the plurality of first transmitting signals is received, wherein when the first sensing signal corresponding to the plurality of first transmitting signals is received, the processor selects a receiving area in a first overlap range to be a final receiving area according to signal intensity of the first sensing signal and controls the receiving area to transmit a second transmitting signal for the first touch device to receive, wherein the final receiving area and a final transmitting area in a second overlap range of the first touch device perform a data transmission process between the first touch device and the second touch device, wherein a number of electrodes in each of the plurality of transmitting areas is greater than a number of electrodes in the receiving area.

16. The processor of claim 15, wherein when the first touch device and the second touch device perform the data transmission process, the final receiving area receives a data sensing signal corresponding to a data transmission signal from the final transmitting area.

17. The processor of claim 16, wherein the data transmission signal corresponds to an invisible barcode.

18. The processor of claim 15, wherein the processor sets a signal intensity threshold value, and selects the receiving area in the first overlap range to be the final receiving area according to the signal intensity threshold value and the signal intensity of the first sensing signal.

19. The processor of claim 15, wherein a first group in the transmitting areas is to transmit the plurality of first transmitting signals with a first frequency, a second group in the transmitting areas is to transmit the plurality of first transmitting signals with a second frequency, and the second frequency is different from the first frequency.

20. The processor of claim 15, wherein a first group in the transmitting areas is to transmit the plurality of first transmitting signals with a first frequency during a first time interval, and a second group in the transmitting areas is to transmit the plurality of first transmitting signals with the first frequency during a second time interval.

* * * * *